United States Patent
Jain et al.

(10) Patent No.: US 11,700,291 B2
(45) Date of Patent: Jul. 11, 2023

(54) AUTOMATIC ISSUE IDENTIFICATION AND STATUS NOTIFICATION OF SCREENSHARING IN A VIRTUAL MEETING

(71) Applicant: MICROSOFT TECHNOLOGY LICENSING, LLC, Redmond, WA (US)

(72) Inventors: Neeraj Kumar Jain, Prague (CZ); Tiphanie Lau, Prague (CZ); Nakul Madaan, Prague (CZ)

(73) Assignee: Microsoft Technology Licensing, LLC, Redmond, WA (US)

(*) Notice: Subject to any disclaimer, the term of this patent is extended or adjusted under 35 U.S.C. 154(b) by 164 days.

(21) Appl. No.: 17/179,751

(22) Filed: Feb. 19, 2021

(65) Prior Publication Data

US 2022/0272134 A1 Aug. 25, 2022

(51) Int. Cl.
*H04L 12/18* (2006.01)
*H04L 65/1083* (2022.01)
*H04L 65/401* (2022.01)
*H04L 65/4038* (2022.01)

(52) U.S. Cl.
CPC ...... *H04L 65/4015* (2013.01); *H04L 12/1827* (2013.01); *H04L 65/1083* (2013.01); *H04L 65/4038* (2013.01)

(58) Field of Classification Search
CPC ............. H04L 65/4015; H04L 65/4038; H04L 12/1827; H04L 65/1083
See application file for complete search history.

(56) References Cited

U.S. PATENT DOCUMENTS

| | | |
|---|---|---|
| 2006/0271624 A1 | 11/2006 | Lyle et al. |
| 2010/0220635 A1* | 9/2010 | Gisby ................. H04L 12/1822 370/260 |
| 2015/0365940 A1* | 12/2015 | Chu .................... H04L 27/2656 370/329 |
| 2017/0244767 A1* | 8/2017 | Jana ...................... H04L 65/403 |
| 2017/0279860 A1* | 9/2017 | Agarwal ............ H04L 65/1083 |
| 2018/0070049 A1* | 3/2018 | Pinheiro e Mota .... H04N 7/147 |

OTHER PUBLICATIONS

"International Search Report & Written Opinion Issued in PCT Application No. PCT/US22/013440", dated Apr. 22, 2022, 10 Pages.

* cited by examiner

*Primary Examiner* — Lesa M Kennedy
(74) *Attorney, Agent, or Firm* — NovoTechIP International PLLC

(57) ABSTRACT

A system and method for automatically detecting issues during screensharing in an online meeting. The system and method allow automatic status notification of screensharing, which facilitates efficient and convenient use of virtual meetings. The system and method also use a live status indicator to provide constant and continuous data about the health of the ongoing screensharing session, which prevents computer and network resources waste on status inquiries. The system and method also recognize a problem/issue of the content-sharing and provide virtual meeting participants real-time action guidance to optimize the quality of content-sharing.

20 Claims, 15 Drawing Sheets

| Content Frame | Timestamp (Starting timed) | Resolution | Timestamp (Assumed end time) |
|---|---|---|---|
| f1 | t=0 | 1024×768 | t=0.7 |
| f2 | t=1 | 1600×1200 | t=1.7 |
| ... | | | |
| fn | t=n | 1024×768 | t=n+0.7 |

FIG. 4A

AUTOMATIC ISSUE IDENTIFICATION AND STATUS NOTIFICATION OF SCREENSHARING IN A VIRTUAL MEETING

BACKGROUND

In online conferences or virtual meetings, screenshare is the most commonly used mechanism to share content with meeting participants. However, current virtual meeting systems do not provide any capability to let a presenter of a screenshare know if the participants have successfully received his or her screenshare. The presenter or sharer must verbally or textually communicate with the participants and receive confirmation from each participant about whether they can see the screenshare. Given the exponential rise in the number of online meetings conducted on a daily basis and screensharing being abundantly used in the meetings, the current approach for obtaining screenshare status has significantly burdened meeting participants and imposed adverse impacts on the meeting productivity using the virtual meeting solutions. Moreover, a screenshare status is not invariable during a screensharing session. The screensharing session may start smoothly but later stop working, freeze, lag, or have content sharing quality degraded. The presenter and the participants have to rely on frequent verbal or textual communications to diagnose if everyone is able to view and follow the screensharing session. This may lead to continuous disruption in the meeting and cause reduced confidence or reassurance of the presenter on managing and controlling screensharing progress, thereby further reducing the virtual meeting efficiency.

Hence, there is a need for an efficient approach of automatically identifying issue(s) of screenshare in an online meeting and notifying certain meeting participant(s) in real time.

SUMMARY

In one aspect, a system for automatically generating detecting issues during screensharing in an online meeting includes a processor, and a memory, coupled to the processor, storing executable instructions. The instructions, when executed by the processor, cause the system to receive, at a server via a first signaling channel, a request for initiating a screensharing session from a first computing device associated with a first presenter of the online meeting, wherein the first presenter shares a set of content frames with a plurality of participants of the online meeting in the screensharing session; in response to receiving the request, initiate the screensharing session by establishing a first media channel for transmitting the set of content frames from a first computing device associated with the first presenter to the server, and establishing a respective second media channel for transmitting the set of content frames from the server to each of second computing devices associated with the plurality of participants; subsequent to transmitting a content frame in the set of content frames to each of the second computing devices via the second media channel, detect, by the server, an acknowledgment response to the content frame from each of the second computing devices on a second signaling channel associated with each of the second computing devices, the acknowledgment response acknowledging recipient of the content frame; perform a diagnosis of the screensharing session by analyzing the acknowledgement response to the content frame from each of the second computing devices according to a preset criterion; generate, by the server, a status notification of the screensharing session; and transmit, via the first signaling channel, the status notification from the server to the first computing device to cause the first computing device associated with the first presenter to display a visual indicator on a meeting interface of the online meeting, wherein the visual indicator indicates a status of the screensharing session.

The above general aspect may include one or more of the following features: generating, by the server, an individual status notification for the participant who fails to receive the content frame, the individual status notification including the reason that the participant fails to receive the content frame and notifying the participant to take appropriate action, and causing the individual status notification to be displayed on a second computing device associated with the participant; determining, by the server, whether to update the status notification of the screensharing session based on acknowledgment responses detected on the second signaling channels within a second threshold time after the first threshold time, and, in response to determining to update the status notification, generating, by the server, an updated status notification and transmitting, via the first media channel, the updated status notification to the first computing device to cause the visual indicator to be automatically updated on the first computing device associated with the first presenter; receiving, at the server via the first signaling channel, target attributes associated with the set of content frames from the first computing device associated with the first presenter, transmitting, via the second signaling channel, the target attributes associated with the set of content frames to each of the second computing devices associated with the plurality of participants, and wherein the acknowledgment response to the content frame is generated by a second computing device based on identifying attributes of the content frame received at the second computing device and comparing the identified attributes to the target attributes associated with the content frame; monitoring, by the server, transmission of each content frame in the set of content frames to each of the second computing devices via the second media channel, detecting, by the server, each acknowledgment response to each content frame from each of the second computing devices associated with the plurality of participants on the second signaling channel, updating the status notification, and transmitting the updated status notification to cause the visual indicator to be automatically updated and displayed on the first computing device associated with the first presenter to reflect a status update determined based on the detected acknowledgment response; notifying at least one of the first presenter and the plurality of participants to take appropriate action when the status notification includes an issue presenting status.

These general and specific aspects may be implemented using a system, a method, or a computer program, or any combination of systems, methods, and computer programs.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 4A is an example table of target attributes.

DETAILED DESCRIPTION

Figure 1:
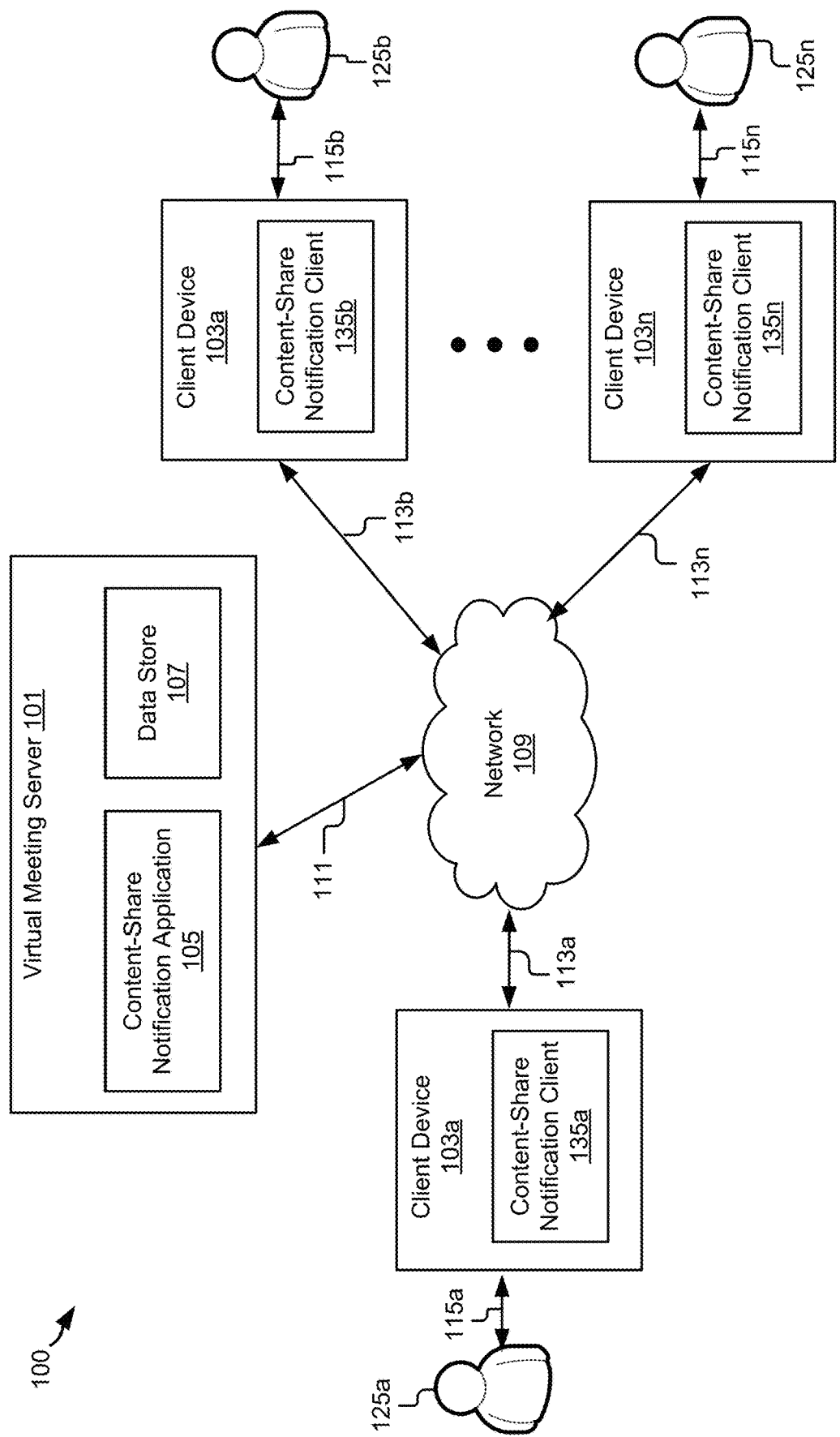
FIG. 1 is a block diagram of an example content-share management system.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

A presenter in an online virtual meeting initiates a screensharing session to share content with other meeting participants. Currently, the presenter would need to ask questions such as "can you see my screen?" verbally or in a text box to obtain the feedback for screenshare from the participants because there are no other ways to do so. This raises a technical problem of how to efficiently obtain feedback for the screenshare from each participant. Even if the screensharing session starts correctly, after some time, the screensharing may be interrupted and some or all of the participants may stop receiving new data via screensharing session, experience a lag in receiving the newly shared data, or receive the newly shared data of reduced quality. In such situations, the presenter may be unaware that other participants no longer view the screenshare normally and the other participants may not be in a position to notify the presenter (e.g., the participants do not know they are supposed to receive a second screen instead of a first screen). Therefore, another technical problem is how to determine if the screenshare status changes as the screensharing session progresses.

The present disclosure provides a technical solution by automatically notifying the presenter or sharer of a screenshare status (e.g., if every participant can view the screenshare), and providing continuous updates or awareness of the screenshare status if the status changes as the screensharing session progresses. This technical solution allows automatic status notification of screensharing, which facilitates efficient and convenient use of virtual meetings. No extra computer resources and network bandwidth need to be spent on manual verbal or textual inquiries about screensharing status. The technical solution described herein also uses a live status indicator to provide constant and continuous data about the health of the ongoing screensharing session, which prevents any further computer and network resources waste on status inquiries. In addition, without disruption from frequent manual inquiries, the user experience is improved. Moreover, the technical solution provides virtual meeting participants real-time action guidance to optimize the quality of content-sharing. For example, a participant may be notified to turn off other software applications running on his/her computer to leave more computer resources for content sharing. This may avoid participants from deviating to other systems to transmit or share data, thereby retaining the users in the current virtual meeting system and increasing the productivity of the virtual meeting system.

When optimizing the quality of content-sharing, the technical solution may recognize a problem/issue of the content-sharing, more specifically, identify the kind of problem and who has caused it. In one implementation, the technical solution described in the present disclosure allows a backend server to track and monitor the signals and content frames respectively transmitted on signaling channels and media channels between the presenter and the meeting participants. Once a screen or content frame is transmitted to the recipient meeting participants via the media channels, the backend server gathers from the signaling channels, the participants' feedback responses to the content frame. The backend server integrates and analyzes these responses to determine whether each recipient received the content frame in time, whether some recipients received the content frame with a delay, whether some recipients did not receive the content frame, whether the received content frame met the quality requirement, etc. Therefore, the technical solution described herein uses a specific technique, i.e., monitoring signals and data transmitted on different channels and integrating and analyzing the signals responding to the transmitted data received from the participants, to solve a technical problem arising in computer networks: identifying a problematic source in the content-sharing process. The source may be computer issues of one or more participants, network connection issues in one area, or even the computer or network issues with the presenter who shares the content. In other words, the technical solution described herein focuses on the specific improvement in computer capabilities, that is, providing an automatic status notification system that monitors network signals in real-time to automatically detect network and/or computer issues in content sharing.

FIG. 1 is a block diagram of an example content-share management system 100. As shown, the system 100 includes a virtual meeting server 101, and one or more client devices 103a-103n coupled for electronic communication via a network 109. It should be understood that the system 100 depicted in FIG. 1 is provided by way of example and the system 100 and/or further systems contemplated by this present disclosure may include additional and/or fewer components, may combine components and/or divide one or more of the components into additional components, etc. For example, the system 100 may include any number of virtual meeting servers 101, client devices 103a-103n, or networks 109.

The network 109 may be a conventional type, wired and/or wireless, and may have numerous different configurations including a star configuration, token ring configuration, or other configurations. For instance, the network 109 may include one or more local area networks (LAN), wide area networks (WAN) (e.g., the Internet), public networks, private networks, virtual networks, mesh networks, peer-to-peer networks, and/or other interconnected data paths across which multiple devices may communicate. The network 109 may also be coupled to or include portions of a telecommunications network for sending data in a variety of different communication protocols. In one implementation, the network 109 includes Bluetooth® communication networks or a cellular communications network for sending and receiving data including via short messaging service (SMS), multimedia messaging service (MMS), hypertext transfer protocol (HTTP), direct data connection, WAP, email, etc.

The client devices 103*a*-103*n* (or collectively client device 103) may include virtual or physical computer processors, memor(ies), communication interface(s)/device(s), etc., which, along with other components of the client device 103, are coupled to the network 109 via signal lines 113*a*-113*n* for communication with other entities of the system 100. In one implementation, the client device 103*a*-103*n*, accessed by users 125*a*-125*n* via signal lines 115*a*-115*n* respectively, may send and receive data to and from other client device(s) 103 and/or the virtual meeting server 101, and may further analyze and process the data. For example, the client devices 103*a*-103*n* may communicate with the virtual meeting server 101 to generate and update a meeting interface for display on each of the client devices 103*a*-103*n*. Non-limiting examples of client device 103 may include a laptop computer, a desktop computer, a tablet computer, a mobile telephone, a personal digital assistant (PDA), a mobile email device, or any other electronic devices capable of processing information and accessing the network 109.

As depicted, the client device 103 includes a content-share notification client 135. For example, the client device 103*a* includes a content-share notification client 135*a*, and the client device 103*b* includes a content-share notification client 135*n*. In one implementation, the user 125*a* is a presenter or sharer of a virtual meeting. The content-share notification client 135*a* installed on the client device 103*a* may be configured to, responsive to user input from the user 125*a*, generate a request for initiating a screensharing session of sharing content/screen and transmit the shared content to recipient meeting participants. The content-share notification client 135*a* may also be configured to receive status notification(s) of the screensharing session from the content-share notification application 105 on the virtual meeting server 101 (described below) and display a visual indicator to reflect the screensharing status in a meeting interface. On the other hand, as the recipients of the shared content, the users 125*b*-125*n* may receive the shared content from the user 125*a* in meeting interfaces through the content-share notification client 135*b*-135*n* installed on client devices 103*b*-103*n*. Each of the content-share notification client 135*b*-135*n* may also be configured to generate and return an acknowledgment response that acknowledges the receipt of the received content by a corresponding client device 103*b*-103*n*. The acknowledgment response is used by the virtual meeting server 101 for generating status notification(s) of the screensharing session. The content-share notification client 135 will be described in more detail below with reference to FIG. 2B.

The virtual meeting server 101 may be a computing device that communicates with one or more client devices 103 to host an online virtual meeting and to process the data exchanged with the one or more client devices 103. In one implementation, the virtual meeting server 101 receives a request from a user 125 (e.g., a meeting organizer) via the client device 103 to establish a virtual space for an online meeting. The virtual meeting server 101 supports chat service, calling service, and other services so that multiple participants can hear, see, chat, and share data with each other in the virtual space. The virtual meeting server 101 may also receive a request from the user 125*a* (e.g., a presenter or sharer) via the content-share notification client 135*a* on the client device 103*a* to start a screensharing session of sharing content and, in response, establish different channels for transmitting the shared content. The virtual meeting server 101 may also track and analyze the communication signals and shared content exchanged in the screensharing session to instruct one or more client devices 103 to automatically update the meeting interfaces with status information of the screensharing session. Based on the status information, the virtual meeting server 101 may further notify certain participant(s) to take appropriate action to improve the quality of content-sharing. In one implementation, the virtual meeting server 101 may include a server-side application to communicate with client-side applications residing on the client devices 103, and to provide the virtual meeting to participants via meeting interfaces. The application may be Microsoft Teams® application, Zoom® application, etc. The virtual meeting server 101 is communicatively coupled to the network 109 via signal line 111.

As depicted, the virtual meeting server 101 includes a content-share notification application 105, which is a server-side application that communicates with the client-side application residing on the client device 103, i.e., the content-share notification client 135, to manage and control the progress of a screensharing session. The user 125*a* (i.e., the presenter) may initiate a screensharing session to share content in the form of content frames (e.g., 15 frames per second) through a content-share notification client 135*a* on the client device 103*a*. In one implementation, the user 125*a* may send a request for sharing a set of content frames to the content-share notification application 105 of the virtual meeting server 101 via a first signaling channel. The user 125*a* may also send target metadata/attributes associated with the set of content frames to the content-share notification application 105 through the first signaling channel. The target metadata may tell a recipient how many frames a recipient (e.g., users 125*b*-125*n*) is supposed to receive, at what time each frame is supposed to receive, and of what resolution that each frame is supposed to receive. For example, the user 125*a* may set up a longer targeted receiving time for a recipient in a distant location since the data transmission needs more time. The content-share notification application 105 may then transmit the target attributes to each recipient via a second signaling channel and so that each recipient knows what he/she should expect to receive.

Upon receiving the content frames from the user 125*a*, the content-share notification application 105 sends the content frames to each content-share notification client 135*b*-135*n* of the recipient client devices 103*b*-103*n* via media channels. When a participant receives a content frame, each recipient may identify attributes of the received content frame, compare the identified attributes to the target attributes associated with the content frame, and generate an acknowledgment response to the content frame. For example, if a recipient is supposed to receive a content frame at 1.2 seconds but actually receive the frame at 1.5 seconds, the recipient may generate the acknowledgment response to show there is a delay. The content-share notification application 105 on the virtual meeting server 101 receives such acknowledgment responses from participants and generates a status notification of the screensharing session for the presenter. For example, when the participants are in the progress of receiving the content frame, the content-share notification application 105 may generate a notification and cause a visual indicator to display a connecting status to the presenter. If every participant receives the content frame within a threshold amount of time, the content-share notification application 105 may update the connecting status to a presenting status and displays the updated status to the presenter. However, if one or more of the participants do not receive the content frame within the threshold amount of time, the content-share notification application 105 may determine there is an issue and update the status to an issue presenting status. The content-share notification application 105 on the virtual meeting server 101 may also communicate with content-share notification client 135 on the client device 103 to provide additional functionalities such as generate an individual status notification to some participants, notify some participants to take appropriate action when there are issue(s) in screensharing, etc. The content-share notification application 105 will be described in more detail below with reference to FIG. 2A.

In one implementation, the virtual meeting server 101 also includes a data store 107. The data store 107 stores different types of signals such as a request for initiating a screensharing session, signal(s) for establishing data channels, signal(s) for transmitting content frames, response(s) to the received content frames, etc. The data store 107 also stores any other information related to the operations described herein, such as content frames transmitted in the screensharing session, target attributes associated with the content frames, actual metadata associated with the received content frames, notifications indicating the status of the screensharing session, notifications of taking appropriate actions, individual notifications relating to a specific participant, etc.

Figure 2A:
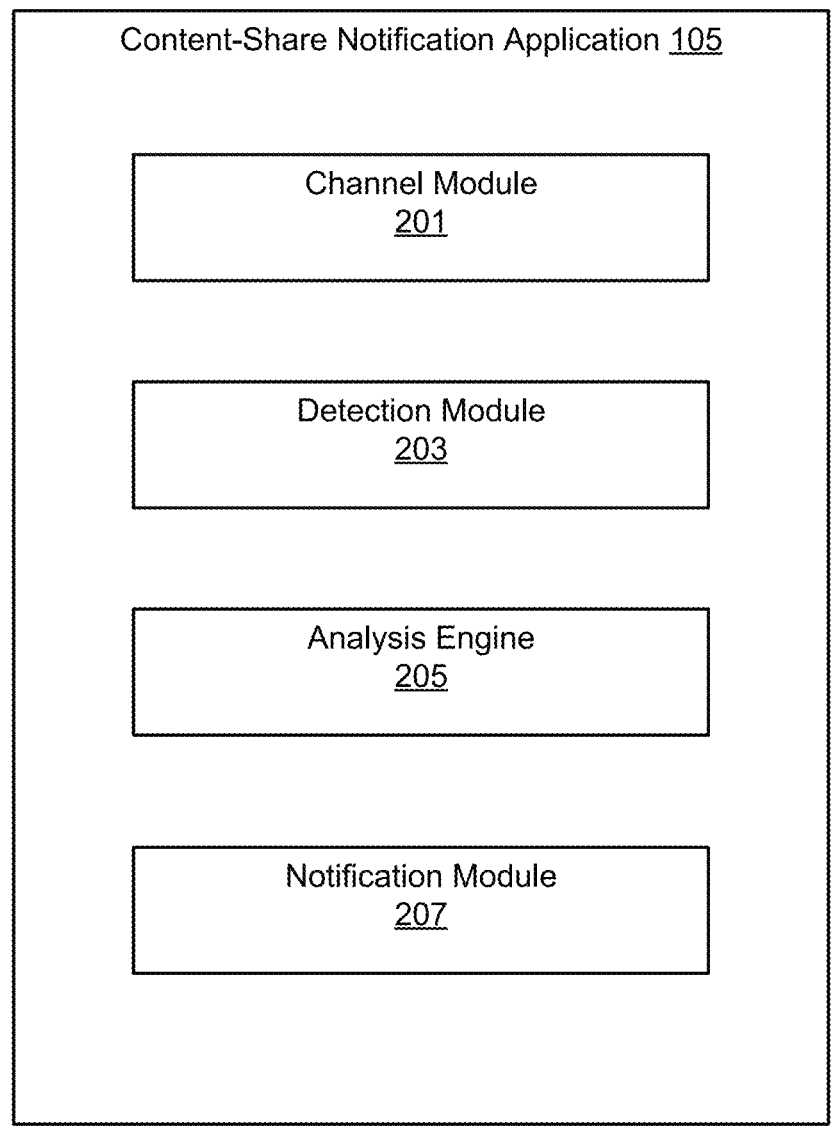
FIG. 2A is a block diagram of example components of a content-share notification application residing on a virtual meeting server.

FIG. 2A is a block diagram of example components of a content-share notification application 105 residing on the virtual meeting server 101. The content-share notification application 105 includes hardware and/or software logic for automatically detecting issues of screensharing in an online meeting and generating and updating status notifications for the screensharing. As a result, at least a presenter who initiates the screensharing does not need to send a verbal or textual inquiry to the participants about whether they have successfully received the shared content when a screensharing session begins and/or during the screensharing session.

In one implementation, the content-share notification application 105 includes a channel module 201, a detection module 203, an analysis engine 205, and a notification module 207. The channel module 201 may establish and maintain channels for transmitting signals and data used in a screensharing session. A channel is a computer path that transfers data and signals between two computing devices. For example, the content-share notification client 135a on the client device 103a may call a first Application Programming Interface (API) function to set up a peer-to-peer information route to exchange data with the content-share notification application 105 of the virtual meeting server 101. Once the data transmission is complete, the content-share notification client 135a may call a second API function to close the information route or channel.

In one implementation, a channel may be a signaling channel or a media channel. The signaling channel is used to transmit the data or signals controlling the progress of the screensharing session. The media channel is used to transmit the content shared by a presenter or sharer (e.g., the user 125a). In an online meeting, the virtual meeting server 101 may start sending the views of the shared screen as a video stream to participants such that the participants are essentially viewing a live online video of the screen of the sharer. In one implementation, the shared content or screens may be transmitted frame by frame, for example, at a frame rate of 15-20 frames per second. For example, if the shared content is a Microsoft® PowerPoint (ppt) document, each slide of the ppt document may correspond to a frame and the ppt document may be transmitted at a frequency of 15-20 slides per second. In one implementation, the channel module 201 may receive a request for initiating a screensharing session from the presenter/sharer of the online meeting over a first signal channel. The request indicates that the presenter (e.g., the user 125a) intends to share a set of content frames with meeting participants specified by the presenter (e.g., all participants other than the presenter or a subset of participants). Responsive to receiving the request, the channel module 201 may establish a first media channel for transmitting the set of content frames from the client device 103a associated with the presenter 125a to the virtual meeting server 101. The channel module 201 may also establish a respective second media channel for transmitting the set of content frames from the virtual meeting server 101 to each of the client devices associated with the participants. For example, the channel module 201 may set up a second media channel with each of the client devices 103b-103n to forward the content data or frame packets received on the first media channel to the user 125b-125n.

Figure 3:
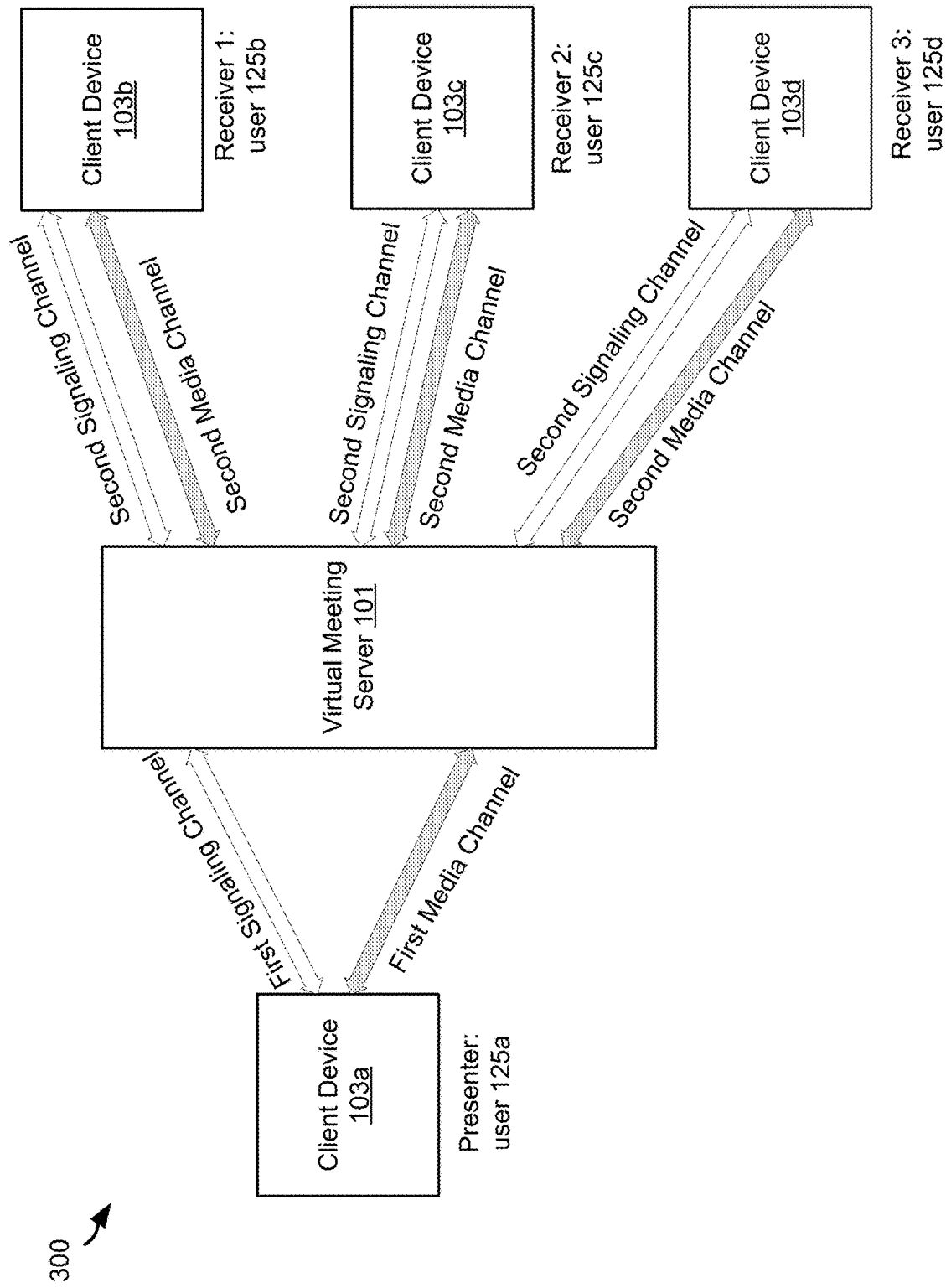
FIG. 3 is a block diagram of example channels between a presenter device and a backend server and between the backend server and recipient devices.

FIG. 3 is a block diagram 300 of example channels between a presenter device and a backend server and between the backend server and recipient devices. As depicted, the presenter device is the client device 103a associated with a presenter, i.e., user 125a. To share content in a screensharing session, the channel module 201 may create a first signaling channel and a first media channel between the client device 103a and the backend server, i.e., virtual meeting server 101. The participants or receivers in the example of FIG. 3 are users 125b, 125c, and 125d. The channel module 201 may also create a second signaling channel and a second media channel between the backend virtual meeting server 101 and each of the recipient client device 103b, 103c, and 103d. The signals that control the transmission of the content frames are transmitted on the signaling channels, while the content frames are transmitted on the media channels.

In one implementation, responsive to or along with receiving the request for sharing the set of content frames, the channel module 201 may also receive target attributes associated with the set of content frames from the client device 103a associated with the presenter 125a via the first signaling channel. The target attributes may identify the assumed/targeted time and quality attributes of each content frame when the content frame is received at a recipient client device. The channel module 201 transmits the target attributes to each of the recipient client devices 103b-103n through the pipelines of second signal channels. The target attributes, which are used in generating a status notification of the screensharing session, will be described in more detail below with reference to FIGS. 4A and 4B.

Once the screensharing session starts and a content frame is transmitted to the second media channels, the detection module 203 may detect an acknowledgment response to the content frame from each participant on a second signaling channel associated with each of the recipient client devices 103b-103n. An acknowledgment response indicates that a specific participant has received the content frame. However, oftentimes, not all participants receive the content frame within a threshold time and at a threshold quality (e.g., resolution), otherwise, there is no need for automatic notification of the status of the screensharing session. Some participants may not receive the content frame at all, and thus never generate the acknowledgment response to this content frame. Sometimes a participant may receive the content frame after an unexpected long transmission time. An acknowledgment response from this participant would reflect this lag. In another case, a participant may receive the content frame within the threshold time but with low quality, which would also be shown in the corresponding acknowledgment response. The detection module 203 collects the acknowledgment responses detected from the second signaling channels and transmits the collected acknowledgment responses to the analysis engine 205 for analyzing and determining the status of the screensharing session. In one implementation, the detection module 203 may continuously track the transmission of each content frame on the second media channels. To capture the status change of the screensharing session and provide a real-time status update, the detection module 203 may further monitor and detect the acknowledgment responses to each content frame transmitted through the second signaling channels until the last content frame is transmitted on the second media channels and the second media/signaling channels are closed by the channel module 201.

The analysis engine 205 performs a diagnosis of the screen share session by analyzing the acknowledgement responses to a content frame received from the detection module 203 based on preset criteria. An acknowledgment response may be generated by the content-share notification client 135b-135n of the client device 103b-103n to acknowledge the receipt of a specific content frame by a specific participant. The acknowledgment response is generated based on the target attributes associated with a set of content frames. The target attributes may identify the assumed/targeted time and quality attributes of each content frame when the content frame is received at a recipient device. In one implementation, the content-share notification client 135a associated with the client device 103a may identify the metadata and timestamp associated with the set of content frames that the presenter 125a plans to share and send the target attributes including the identified metadata via the first signaling channel to the backend virtual meeting server 101. In another implementation, the analysis engine 205 of the virtual meeting server 101 may determine the target attributes based on the timestamps and other information related to the set of content frames received from the content-share notification client 135a associated with the client device 103a. The target attributes may then be transmitted to each recipient client device 103b-103n through the second signaling channels to inform each recipient how many frames they are supposed to receive, at what time, at what resolution/quality.

In one implementation, the target attributes include at least one of a number of content frames in the set of content frames, a starting timestamp indicating a time when each content frame was sent by the client device 103a associated with the presenter 125a, a resolution of each content frame that a recipient client device 103b-103n is targeted to receive, and an end timestamp indicating a time when the recipient client device 103b-103n is targeted to receive each content frame. FIG. 4A is an example table 400 of target attributes. The target attributes include metadata associated with the content frames sent to the recipient client device 103b by the presenter's client device 103a. The table 400 includes a content frame 401, starting timestamp 403, resolution 405, and assumed end timestamp 407. Each row of 411, 413, and 415 lists the attributes of a content frame. For example, frames f1, f2 through fn, i.e., a total number of n frames, will be shared in a screensharing session. Frame f1 will be sent at t=0, and should be received by a participant at t=0.7 with a resolution of 1024×768 pixels. The assumed time 0.7 seconds is determined based on the processing time of computing devices and transmission time of the frame packet over the media channels. Frame f2 will be sent at t=1, and should be received by a participant at t=1.7 with a resolution of 1600×1200 pixels. Frame fn will be sent at t=n, and should be received by a participant at t=n+0.7 with a resolution of 1024×768 pixels. The unit of time is second.

Figure 4B:
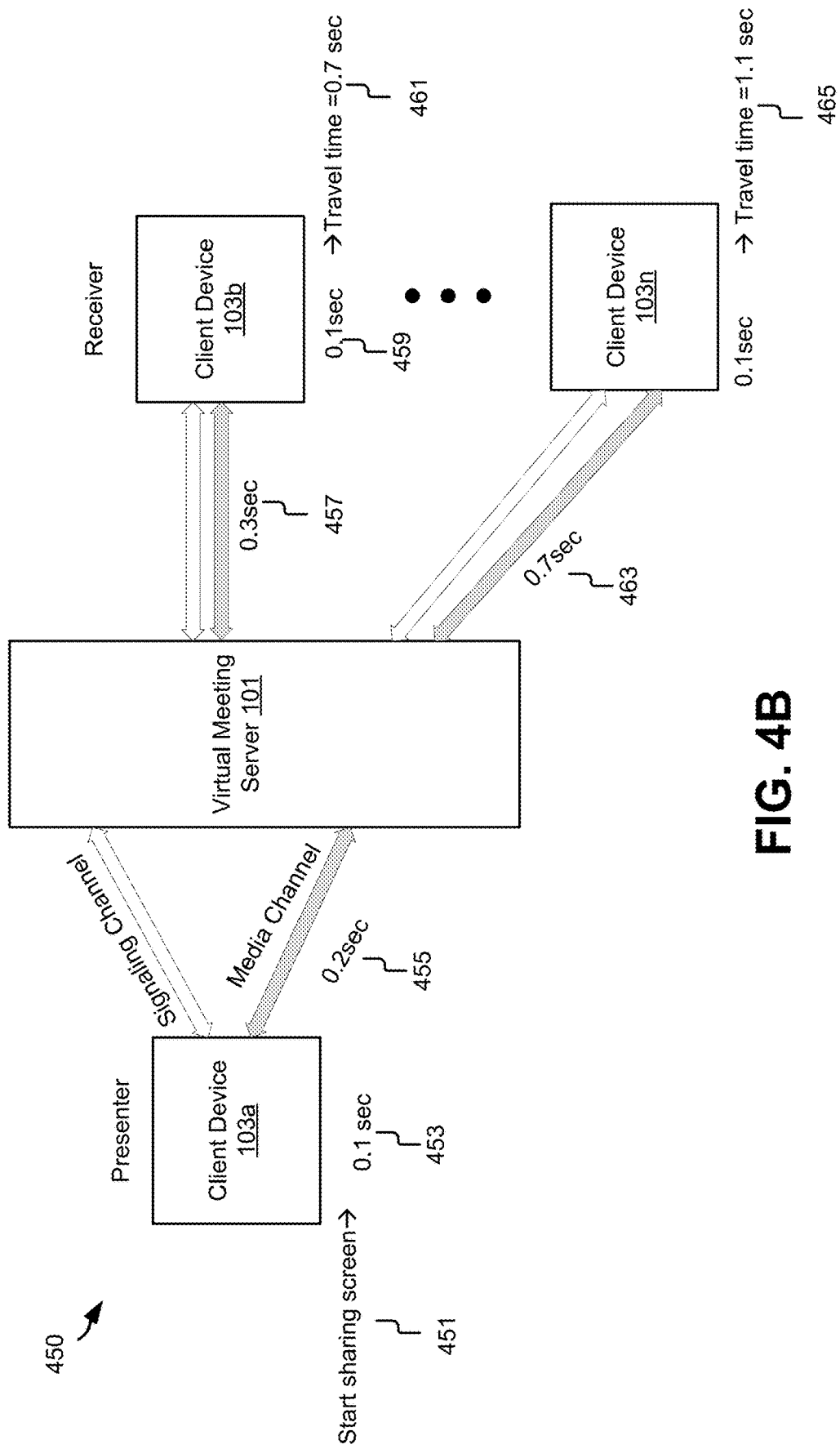
FIG. 4B is a block diagram of an example procedure of estimating assumed/targeted receiving time.

FIG. 4B is a block diagram 450 of an example procedure of estimating assumed/targeted receiving time. The presenter/sharer 125a of an online meeting starts to share the screen at 451 using the associated client device 103a. The shared screen will be received by the client devices 103b-103n associated with the receivers or participants 125b-125n of the online meeting. At 453, the processing time of each content frame at the client device 103a is determined to be 0.1 seconds. At 455, the transmission time of each content frame through the first media channel is determined to be 0.2 seconds. At 457, the transmission time of each content frame through the second media channel to the recipient client device 103b is determined to be 0.1 seconds. At 459, the processing time of each content frame at the client device 103b is determined to be 0.1 seconds. Therefore, at 461, the total travel time of a content frame from the presenter's client device 103a to the recipient's client device 103b is 0.1+0.2+0.3+0.1=0.7 seconds. This travel time, as part of the target attributes, will be transmitted to the client device 103b to anticipate the first frame f1 arrived at t=0.7, the second frame f2 arrived at t=1.7, and so forth (since the first frame f1 is sent at t=0, the second frame f2 is sent at t=1 as shown in FIG. 4A). A person with ordinary skill in the art will recognize that the total travel time can be a range of time that counts in some other factors that may affect the transmission and/or processing time. For example, the travel time may be 0.8 seconds to include an additional allowance/tolerance time 0.1 seconds. The travel time may also range from 0.8 seconds to 1.2 seconds.

In one implementation, the analysis engine 205 or the content-share notification client 135a installed on the presenter's client device 103a may determine the travel time of a content frame based on criteria including at least one of the locations of the presenter and/or the participants, the time that the screensharing session happens (e.g., during a day, a week, or a month), the type of shared data, historical sharing records with the presenter and/or the participants, and the information received from the presenter and/or the participants. For example, the data transmission time may be different for recipients at different locations. As depicted in FIG. 4B, the transmission time of each content frame through a second media channel to the recipient client device 103n is 0.7 seconds at 463 instead of 0.3 seconds at 457, and, therefore, the travel time of a content frame to the client device 103n is 1.1 second at 465. For example, both user 125a (sharer) and user 125b (first recipient) are located in the US while user 125n (second recipient) is located in China. The data transmission to China is longer, and thus the client device 103n is assumed to receive the content frame 0.3 seconds later than the client device 103b. Even if two participants are in the same location, the analysis engine 205 may determine a different travel time for the participants when the content is shared at a different time of day based on another criterion. In one implementation, the analysis engine 205 may select a maximum travel time from one or more travel times determined for different recipients and include the maximum travel time in the target attributes for transmitting to each recipient client device. In this example, 1.1 seconds instead of 0.7 seconds may be transmitted and used for determining the status of the screensharing session.

Referring back to FIG. 2A, the analysis engine 205 communicates with the detection module 203 to detect the acknowledgment responses to a content frame shared in a screensharing session, and aggregates and analyzes the acknowledgment responses to obtain status information of the screensharing session. The acknowledgment response, generated by participants based on the target attributes, reflects whether a specific participant receives the right content frame at the right time with the right resolution/quality. When the screensharing session starts, the analysis engine 205 determines if a content frame is received successfully, in progress, or failed. In one implementation, if all the recipient client devices 103b-103n send acknowledgment responses, the analysis engine 205 may determine that the overall status of the screensharing session is "Success." However, even if a single recipient client device fails to send the acknowledgment response, the analysis engine 205 may determine that the overall status of the screensharing session is "Failure." While waiting for the recipient client devices to send the success signal, the analysis engine 205 may determine that the status is "In Progress."

The status of the screensharing session may change as the screensharing session continues. Based on the continuously received acknowledgment responses, the analysis engine 205 may determine whether the recipient client devices are receiving the latest frames without delay and at a correct resolution. For example, even if the screensharing session starts with "Success," the analysis engine 205 may change it to a "Failure" status when a recipient client device 103b is not receiving the latest frame, or there is a significant delay for the recipient client device 103b receiving the frame, or the resolution of the received content frame is low. The analysis engine 205 sends the aggregated acknowledgment responses and the status information to the notification module 207 to generate a status notification.

In one implementation, the notification module 207 may transform the overall status information received from the analysis engine 205 to a status notification, and transmit, via the first signaling channel, the status notification to the client device 103a associated with the presenter 125a to cause a visual indicator to be automatically displayed to the presenter 125a. Suppose the presenter 125a shares the content frames using the client device 103a with other meeting participants 125b-125n. The visual indicator reflects at least a status of the screensharing session. In one implementation, the notification module 207 may determine a connecting status, a presenting status, and an issue presenting status. The connecting status indicates that each of the recipient client devices 103b-103n associated with meeting participants 125b-125n is in the progress of receiving a content frame. The notification module 207 determines a connecting status in the initial stage of a screensharing session when no acknowledgment response to a content frame has been returned to the presenter. Once a round trip time (as described below) of transmitting a first content frame is met, the notification module 207 detects any possible issues in the screenshare and determines a presenting status or issue presenting status. The presenting status indicates that each of the recipient client devices 103b-103n has successfully received the content frame of a threshold quality within a first threshold time. The issue presenting status, however, includes two scenarios. The issue presenting status may indicate that at least one of the recipient client devices 103b-103n fails to receive the content frame within the first threshold time. The issue presenting status may also indicate that each of the recipient client devices 103b-103n has successfully received the content frame within the first threshold time, but the content frame received by at least one of the recipient client devices 103b-103n fails to satisfy a threshold quality.

Suppose a first content frame f1 is sent by the presenter P1 (e.g., user 125a) at t=0. The first content frame is assumed to be received by nine recipients R1-R9 (e.g., user 125b-125j) at t=0.7 seconds with a resolution 1024×768 (e.g., as shown in FIG. 4A). Because it takes about 0.7 seconds to transmit the first content frame one-way to a recipient, the presenter P1 may expect to receive an acknowledgment response to this content frame after 1.4 seconds, that is, a round trip time (RTT) for getting feedback to a content frame from a recipient is 2×0.7=1.4 seconds. Therefore, once the first content frame f1 was sent out at t=0, the notification module 207 may determine a connecting status for this screensharing session in the time range [0, 1.4]. During this time range, an acknowledgment response is on the way back to the presenter P1. Given an allowance time, for example, 0.1 seconds, the presenter should have received some acknowledgment responses at t=1.5. This t=1.5 is a first threshold time. Suppose nine responses from nine receivers R1-R9 are all received by P1 within 1.5 seconds, at t=1.5, the notification module 207 may change the connecting status to a presenting status. However, if at t=1.5, only six messages from R1-R6 are received by P1, the notification module 207 would change the connecting status to an issue presenting status because R7-R9 did not get the first content frame on time. Although an issue presenting status is determined at t=1.5, at this time point, there is no way to determine whether the first content frame f1 is delayed in the transmission to R7-R9 or R7-R9 did not receive the first content frame at all. Therefore, at a second threshold time, for example, at t=2.6, the notification module 207 again determines the status of the screensharing session regarding the first content frame f1. If P1 receives the response from R7-R9 between t=1.5 and t=2.6, the notification module 207 may update the status notification to show the delays from R7-R9. However, If P1 receives the response from R7 but not from R8 and R9 within t=2.6, the notification module 207 may update the status notification to indicate that R7 is experiencing a lag and R8 and R9 are offline. In one implementation, the notification module 207 may wait for an additional time, e.g., the transmission time of one or two more responses, to identify an offline issue. For example, instead of using the second threshold time t=2.6 as a deadline for an offline determination, the notification module 207 may specify a third threshold time t=4. If P1 still does not receive the acknowledgment response to the first content frame f1 from R8 and R9 within t=4, the notification module 207 would determine that R8 and R9 are offline.

In one implementation, the notification module 207 also uses the quality factor in determining the status of the screensharing session. Continuing with the above example, only if nine responses from nine receivers R1-R9 are received by P1 within 1.5 seconds and none of these responses reflects any quality issue of the received content frame, the notification module 207 may determine a presenting status. Otherwise, if nine responses are received by P1 within 1.5 but one or more of the nine responses show that receiver(s), e.g., R2, received the first content frame with a resolution lower than the targeted solution 1024×768, this poor-quality factor may also cause the notification module 207 to determine an issue presenting status rather than a presenting status.

In one implementation, the notification module 207 may also use the acknowledgment responses from the recipients to identify a potential issue of the presenter and to further determine the status of the screensharing session. For example, if P1 does not receive any acknowledgment response from any receivers R1-R9 at the first threshold time t=1.5, the notification module 207 may determine that the presenter has a network issue or offline.

The shared content is transmitted to R1-R9 as a video stream. Therefore, after the first content frame is transmitted, the second content frame, the third content frame . . . are transmitted in order. Once the corresponding acknowledgment responses to each content frame are received and analyzed, the notification module 207 updates the status of the screensharing session if there is a status change. For example, if P1 sends the second content frame f2 at t=1, then the notification module 207 determines whether all nine responses to the frame f2 are received at the first threshold time t=2.5, determines whether any responses are delayed at the second threshold time t=3.6, and determines whether any remaining responses are received at the third threshold time t=5, etc. Based on the continuous status analysis, the notification module 207 may expand the categories of identified issues. For example, the notification module 207 may identify issues such as R2 did not receive 20 frames in one second, R1 may have received the 20 frames but with lags, while R3 may have some of the 20 frames skipped. With the more extensive issue identification, the notification module 207 may generate the status notification that includes richer information.

In one implementation, the analysis engine 205 and/or the notification module 207 may define a set of criteria for determining the status of the screensharing session. For example, the notification module 207 may determine that the presenter's device has a network issue based on a first criterion that over 50% of the recipients do not return the acknowledgment responses to the backend virtual meeting server 101 within a threshold time. Based on a second criterion, the notification module 207 may determine that the presenter's device is offline if over 80% of recipients do not return the acknowledgment responses. The notification module 207 may further adjust these percentages based on a third criterion, for example, the historical sharing experience with the presenter. In another example, the parameters used in the status determination, such as the above allowance time, the second threshold time, the third threshold time, may be configured and adjusted by the analysis engine 205 and/or the notification module 207 based on preset criteria. For example, if content frames are transmitted to the recipients at a lower frame rate, a longer allowance time may be configured.

Responsive to generating a status notification of a screensharing session, the notification module 207 may cause a visual indicator to be automatically displayed to a presenter or sharer. For example, when a participant 125a in a virtual meeting starts a screensharing session, a visual indicator may be displayed on a top corner of a sharing toolbar in the meeting interface associated with the client device 103a. The visual indicator indicates the status of the screensharing session such as the connecting status, presenting status, or issue presenting status. The visual indicator is a live and flexible indicator showing the dynamic status change of the screensharing session. In one implementation, the visual indicator may be a color indicator. For example, a green indicator shows the screen share is normal (i.e., in either a connecting status or a presenting status) while a red indicator shows that the screen share is problematic (i.e., in the issue presenting status). In another implementation, the visual indicator may show a specific status and include a status description of the specific status. For an issue presenting status, the status description may include at least one of an identity of a participant who has difficulty in receiving the screenshare and potential issue(s) the participant is facing. For example, a potential issue may be identified by an error code included in the acknowledgment response or the failure signal indicating that a recipient is receiving the content frame of poor quality. The status description of a visual indicator, for example, may include "R1 is experiencing lags," "R2 is receiving poor quality screenshare," "R3 is not receiving full content of the screenshare," and "R4 is offline or has a network issue," which list the names of participants who did not receive the content frame properly and reasons that the participants did not receive the content frame properly. By displaying a live visual indicator to show dynamic status, the present disclosure is at least advantageous on three aspects: (1) automatically indicating the status information of a screensharing session; (2) continuously updating the status information; and (3) identifying which meeting participant has a problem in screensharing session and what type of the problem the meeting participant has. Example visual indicators are depicted in FIGS. 7A-7E.

Once an issue occurred in a screensharing session is recognized, the notification module 207 may also communicate with an action module (not shown) to determine appropriate action and notify the corresponding participant to take the action to address the issue. The action may include restarting a computing device, reconnecting to a network router, close software applications on a computing device to reduce CPU or memory usage, etc. For example, if a first threshold number of frames are skipped by a second threshold number of recipients, the notification module 207 may determine that the presenter did not send the content frames correctly, and as a result, notify the presenter to examine his/her network connection and re-send the shared content with a good quality of network.

Figure 2B:
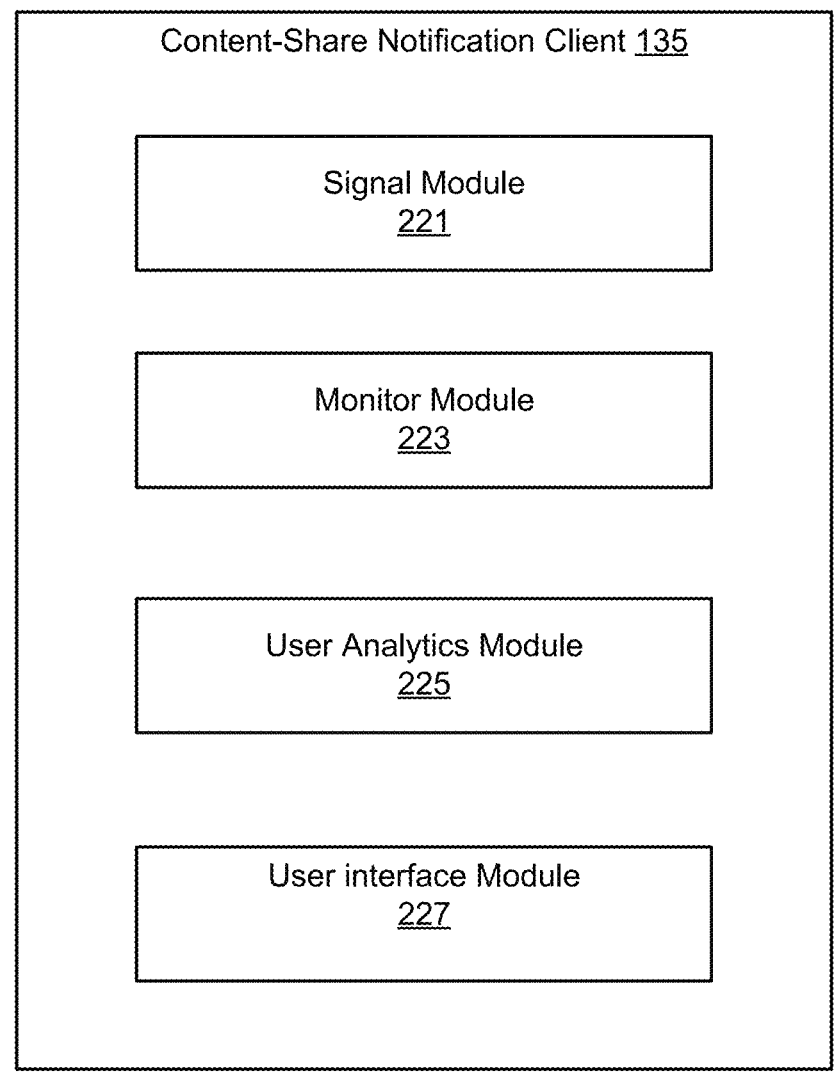
FIG. 2B is a block diagram of example components of a content-share notification client residing on client devices.

FIG. 2B is a block diagram of example components of a content-share notification client 135 residing on the client devices 103. Depending on whether the client device 103 is used by a presenter to send shared content or used by a recipient to receive the shared content, the content-share notification client 135 residing on the client device 103 may communicate with the content-share notification application 105 of the backend virtual meeting server 101 to implement different functionalities described herein.

In one implementation, the content-share notification client 135 includes a signal module 221, a monitor module 223, a user analytics module 225, and a user interface module 227. The signal module 221 may be used by a presenter to send a request for initiating a screensharing session to the content-share notification application 105 of the virtual meeting server 101 via a first signaling channel. The request may include the identities of the participants that receive a set of content frames in the screensharing session. The signal module 221 may also send the target attributes associated with the set of content frames over the first signaling channel. The signal module 221 may further be configured to transmit status notification(s) of the screensharing session to the presenter. In another implementation, the signal module 221 may be used by a recipient to return an acknowledgment response that acknowledges the receipt of a received content frame over a corresponding second signaling channel.

The monitor module 223 runs a monitoring service on recipient client devices 103b-103n to examine the received content frame(s) and communicates with the signal module 221 to send back an acknowledgment response or feedback signal confirming the receiving of a content frame over second signaling channels. The monitor module 223 may also continuously monitor the reliability and quality of incoming screenshare video streams over second media channels. In one implementation, the monitor module 223 may continuously ping the content-share notification application 105 of the virtual meeting server 101 to make sure that a recipient client device is receiving the latest frames without delay and at the correct resolution. The monitor module 223 transmits the received content frame(s) for further analysis by the user analytics module 225.

Responsive to receiving a content frame, the user analytics module 225 generates an acknowledgment response to the content frame and instructs the signal module 221 to send the generated acknowledgment response back to the virtual meeting server 101 via the second signaling channel. When a screensharing session starts, the user analytics module 225 receives the target attributes associated with the set of content frames to be shared in the screensharing session. The target attributes allow every recipient to know how many frames they are supposed to receive, at what time, at what resolution/quality. In one implementation, upon receiving the target attributes and the content frame, the user analytics module 225 may identify attributes of the received content frame, compare the identified attributes to the target attributes associated with the content frame, and generate an acknowledgment response based on the comparison result. By matching the metadata of the received content frame to the metadata included in the target attributes, the user analytics module 225 would recognize whether there is a lag, bad quality, or other problems, and generate the acknowledgment response to reflect these problems.

In one implementation, the user analytics module 225 generates an acknowledgment response based on comparing the received frame count with the metadata in the target attributes. The user analytics module 225 may determine whether a current frame received by the recipient client device is the latest frame, whether the target/assumed number of frames have been received, and whether one or more content frames have been skipped. In another implementation, the user analytics module 225 also compares the timestamp of the received frame with the metadata in the target attributes when generating the acknowledgment response. The user analytics module 225 may determine whether there is a lag or whether the recipient client device is offline. In yet another implementation, the user analytics module 225 also compares the resolution of the received frame with the metadata in the target attributes to determine the quality of the received frame when generating the acknowledgment response. In other words, the user analytics module 225 may detect that a recipient is not receiving the latest frames, there are significant delays (e.g., screenshare frozen or delayed), or the resolution of screenshare frames are low (e.g., poor quality, unreadable screenshare), and send an acknowledgment response of a failure signal to cause a status of the screensharing session to be generated and displayed to the presenter.

Figure 8:
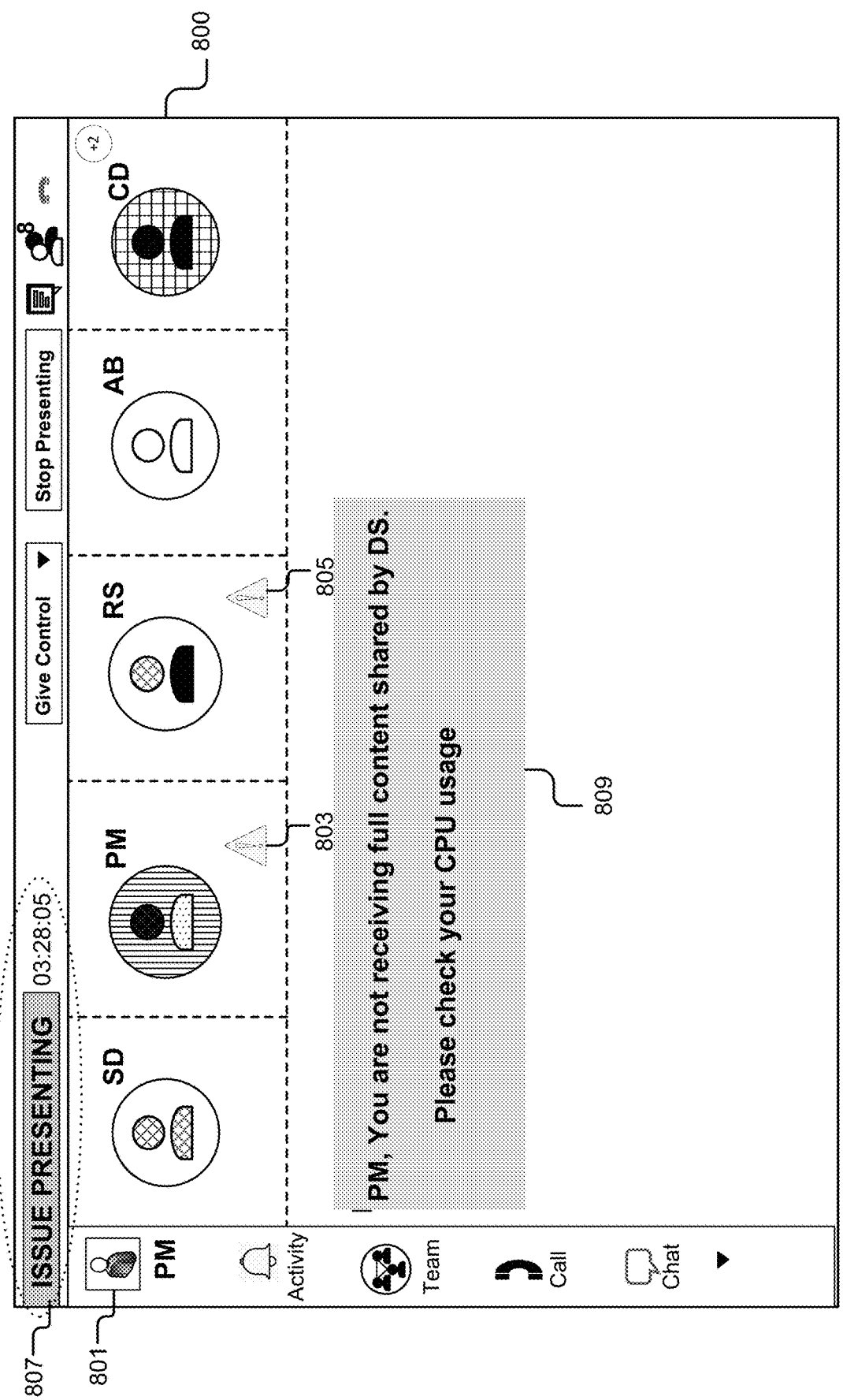
FIG. 8 is an example graphical user interface of an individual status notification.

In addition to notifying the presenter of the failure in the screensharing session, the user analytics module 225 may also notify the participant(s) who caused the screenshare failure to take appropriate action to improve the screensharing. In one implementation, the user analytics module 225 may generate an individual status notification for a participant who did not receive the content frame properly and cause the individual status notification to be displayed on the recipient client device associated with the participant. The individual status notification includes a potential reason that the participant did not receive the content frame properly and notifies the participant to take appropriate action. For example, the problematic recipient may receive a notification or other visual indicator to show that he/she has a problem with screensharing, such as "you have a problem receiving the screen share, please check network" or "the lag is too long, please check your CPU usage." If the presenter is the meeting participant who caused the issue of screensharing, in one implementation, the user analytics module 225 may generate an individual status notification in addition to the live status notification of the screensharing session. An example individual status notification is shown in FIG. 8.

The user interface module 227 receives instruction(s) from the content-share notification application 105 of the virtual meeting server 101 to send graphical data to the client device 103, causing the client device 103 to present a meeting interface of a virtual meeting to a participant. In one implementation, the user interface module 227 may receive instruction(s) from the content-share notification application 105 to send graphical data to the presenter's client device 103a, causing the client device 103a to display a visual indicator of the status of the screensharing in the meeting interface. In another implementation, the user interface module 227 may also communicate with the user analytics module 225 to generate an individual status notification or a prompt for display on the meeting interface associated with one or more participants who have difficulty in receiving or sending screen share. In yet another implementation, the user interface module 227 may generate a meeting interface that allows a participant to provide input for configuring specific functionalities, for example, sending a request for initiating a screensharing session. The user interface module 227 may generate graphical data for providing other user interfaces to meeting participants.

Figure 5:
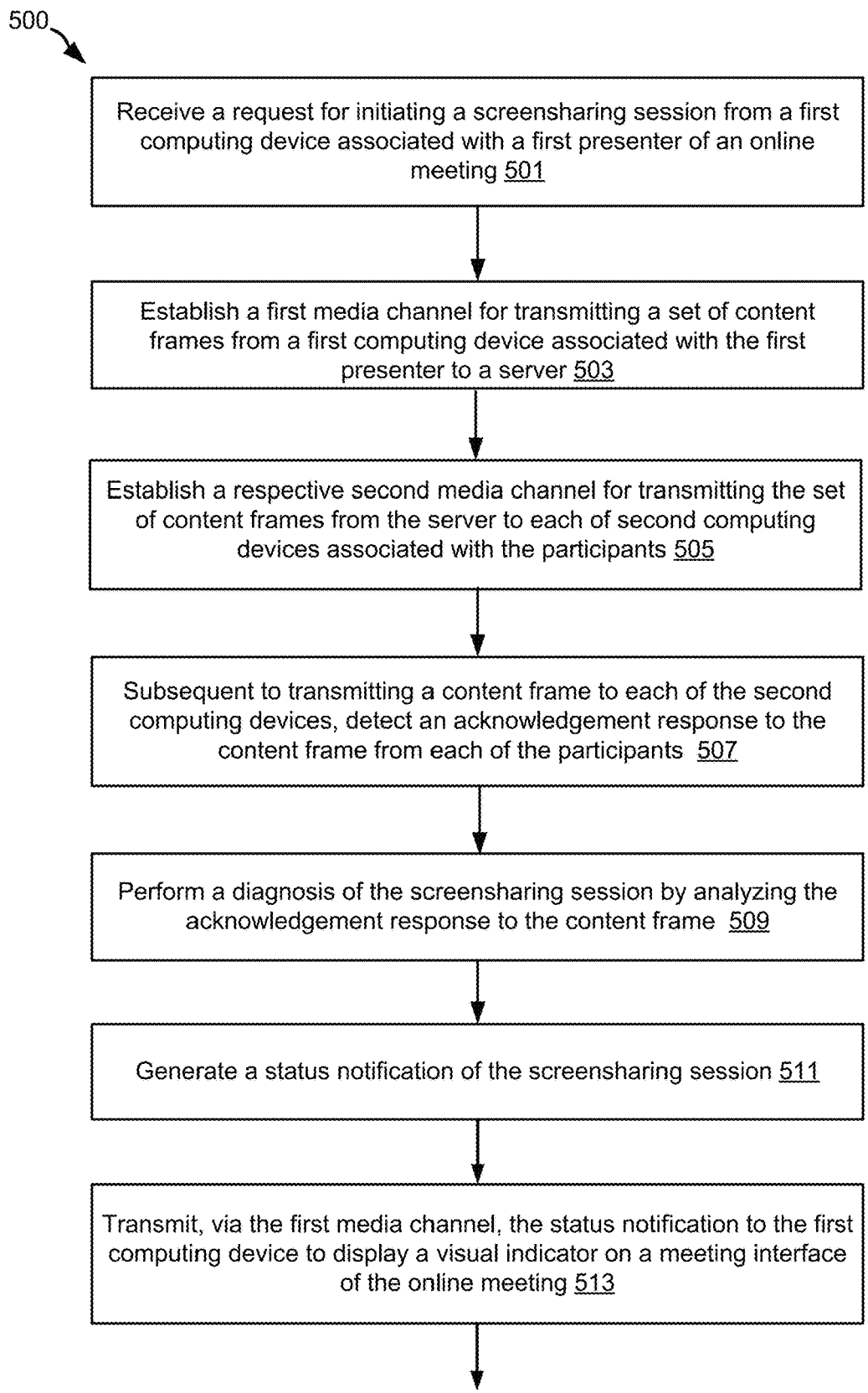
FIG. 5 is a flowchart of an example method for generating a status notification identifying issues of a screensharing session.

FIG. 5 is a flowchart of an example method 500 for generating a status notification and identifying issues of a screensharing session. The method is implemented by a content-share notification application 105 of the virtual meeting server 101 communicating with the presenter's client device 103a and one or more recipient client devices 103b-103n associated with the participants 125b-125n. At block 501, the content-share notification application 105 receives a request for initiating a screensharing session from a first computing device associated with a first presenter of an online meeting via a first signaling channel. For example, the client device 103a associated with the first presenter (e.g., user 125a) sends a set of content frames to one or more of the client devices 103b-103n associated with participants (e.g., users 125b-125n). In response to receiving the request, the content-share notification application 105 initiates the screensharing session. At block 503, the content-share notification application 105 establishes a first media channel for transmitting the set of content frames from the first computing device associated with the first presenter (e.g., the client device 103a) to the server (e.g., the virtual meeting server 101). At block 505, the content-share notification application 105 establishes a respective second media channel for transmitting the set of content frames from the server to each of the second computing devices (e.g., client devices 103b-103n) associated with the participants (e.g., users 125b-125n).

At block 507, the content-share notification application 105, subsequent to transmitting a content frame in the set of content frames to each of the second computing devices via the second media channel, detects an acknowledgment response to the content frame from each of the second computing devices on a second signaling channel associated with each of the second computing devices. The acknowledgment response acknowledges the receipt of the content frame by a second computing device associated with a specific recipient. The acknowledgment response is generated based on target attributes associated with the set of content frames. The target attributes may identify the assumed/targeted time and quality attributes of each content frame when the content frame is received at each of the second computing devices.

At block 509, the content-share notification application 105 performs a diagnosis of the screensharing session by analyzing the acknowledgement response to the content frame from each of the second computing devices according to a preset criterion. For example, if the screensharing is at the initial stage based on a criterion (e.g., within the round-trip-time of the first content frame), the content-share notification application 105 determines that the recipient client devices are connecting although no acknowledgment response from any recipient client devices has yet been returned to the presenter. At block 511, the content-share notification application 105 generates a status notification of the screensharing session based on the analysis. The status notification identifies the status including a connecting status, a presenting status, and an issue presenting status. When the status of the screensharing session is the issue presenting status, the status notification may also include an issue description. The issue description includes at least one of an identity of a participant who did not receive a content frame properly and a reason that the participant did not receive a content frame properly. At block 513, the content-share notification application 105 transmits, via the first signaling channel, the status notification to the first computing device to display a visual indicator on a meeting interface of the online meeting. The visual indicator indicates a status of the screensharing session.

Figure 6:
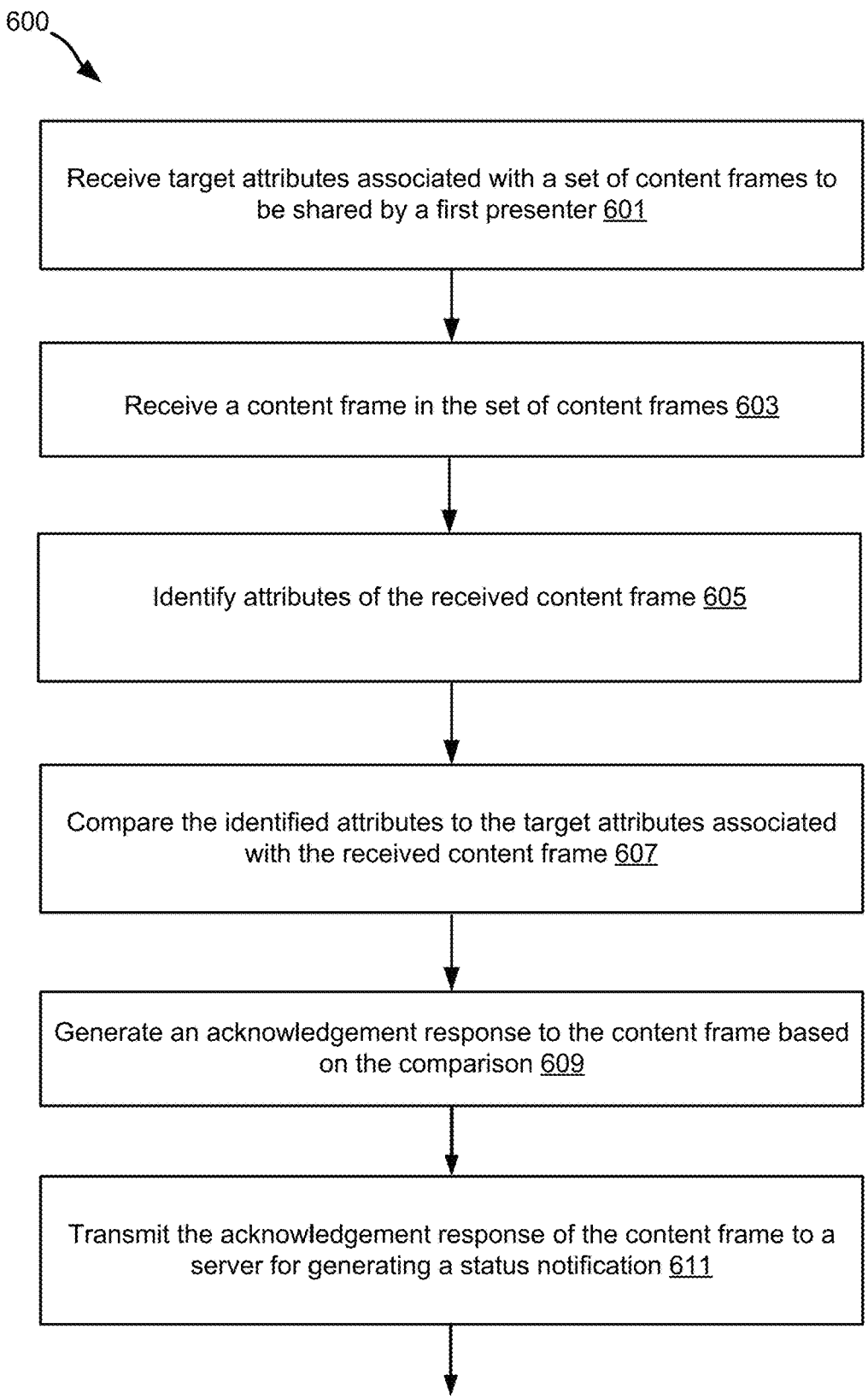
FIG. 6 is a flowchart of an example method for generating an acknowledgment response by a recipient client device.

FIG. 6 is a flowchart of an example method 600 for generating an acknowledgment response by a recipient client device. The recipient client device may be one of the client devices 103b-103n associated with the meeting participants 125b-125n. A content-share notification client 135 residing on the recipient client device is used to implement the method 600. At block 601, the content-share notification client 135 receives target attributes associated with a set of content frames to be shared by a first presenter (e.g., user 125a). The target attributes include metadata that identifies the assumed/targeted time and quality attributes of each content frame when the content frame is received at a recipient client device. At block 603, the content-share notification client 135 receives a content frame in the set of content frames. At block 605, the content-share notification client 135 identifies attributes of the received content frame. At block 607, the content-share notification client 135 compares the identified attributes to the target attributes associated with the received content frame. At block 609, the content-share notification client 135 generates an acknowledgment response to the content frame based on the comparison. For example, the content-share notification client 135 may generate the response based on comparing the received frame count, the timestamp of the received frame, and the resolution of the received frame, with the metadata in the target attributes. At block 611, the content-share notification client 135 transmits the acknowledgment response of the content frame to a server (e.g., the virtual meeting server 101) for generating a status notification. For example, the content-share notification client 135 may detect that a recipient is not receiving the latest frames, there are significant delays, or the resolution of screenshare frames are low, and send an acknowledgment response of a failure signal to cause a status of the screensharing session to be generated and displayed to the first presenter.

FIGS. 7A-7E are example graphical user interfaces of visual indicators displayed to a presenter. A presenter requests initiating a screensharing session for sharing a set of content frames with one or more recipient meeting participants in a virtual meeting. At one time, a recipient meeting participant may not receive a content frame. At another time, the recipient meeting participant may or may not receive a content frame on time or with a correct resolution. The user interfaces in FIGS. 7A-7E are meeting interfaces associated with an online virtual meeting that is displayed for the presenter. In addition to including an area for displaying visual representations of participants, each meeting interface in FIGS. 7A-7E also includes an example visual indicator that reflects the different status of an ongoing screensharing session. This visual indicator is automatically displayed and updated on the meeting interface without the presenter manually inquire such status in the virtual meeting.

Figure 7A:
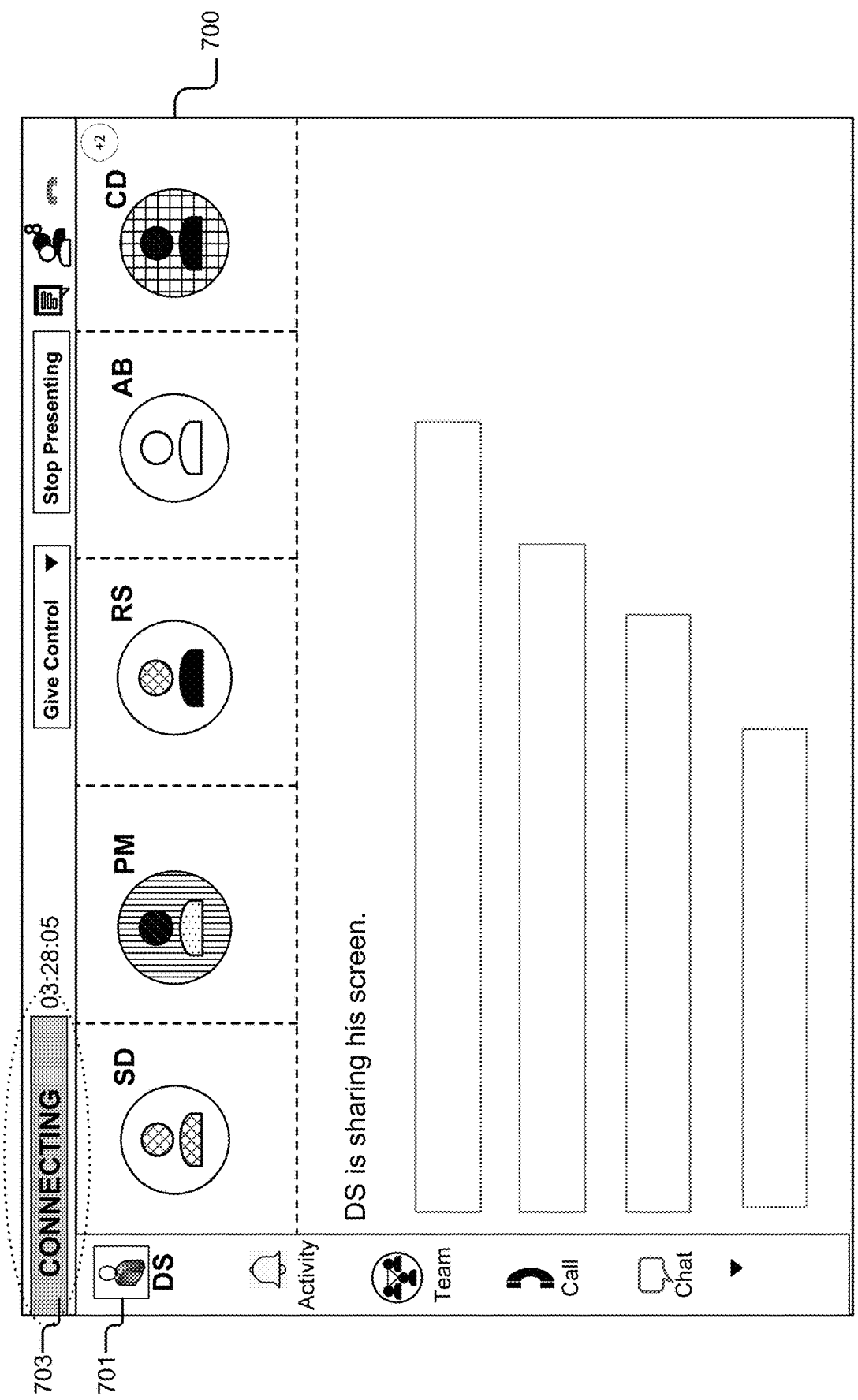
FIGS. 7A-7E are example graphical user interfaces of visual indicators displayed to a presenter.
Figure 7B:
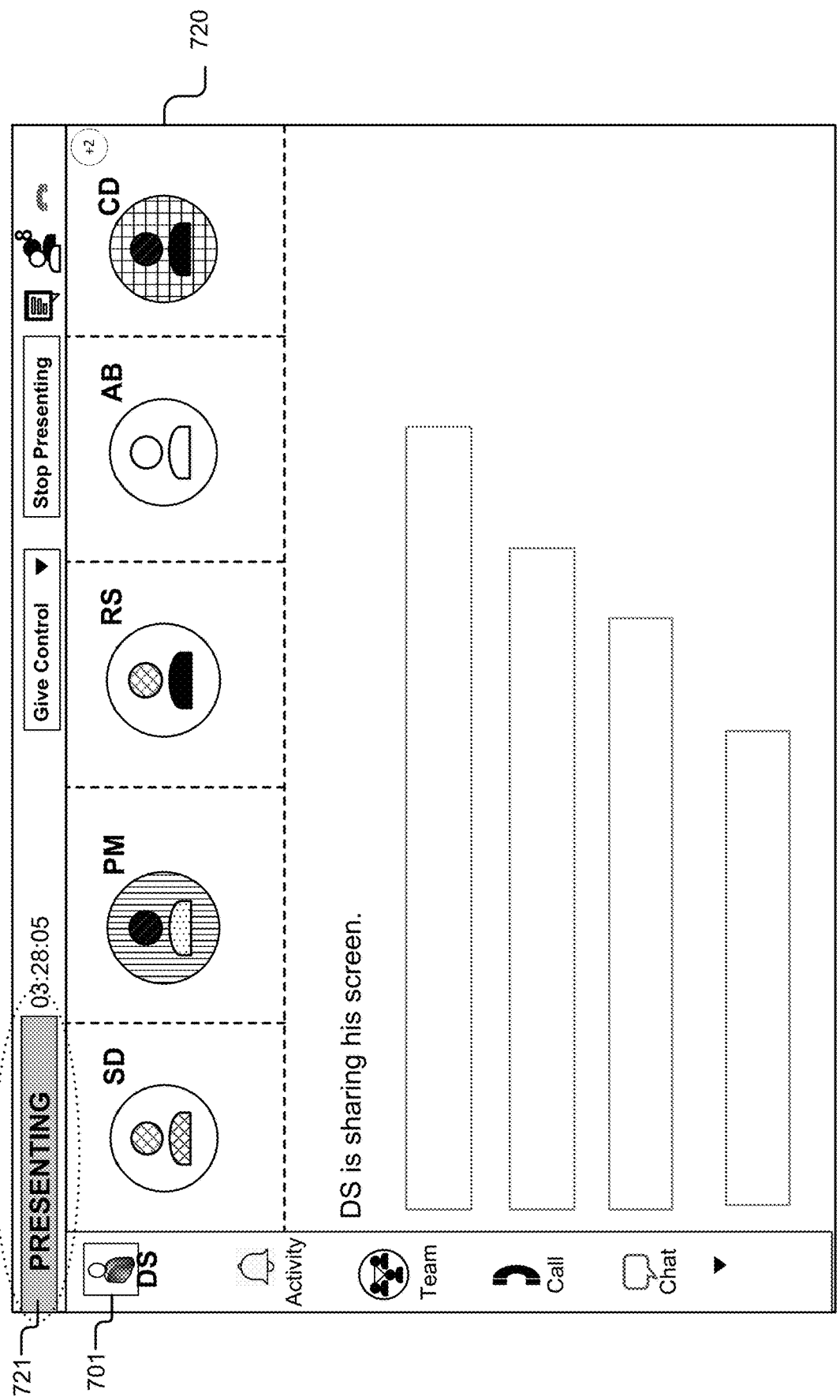
Figure 7C:
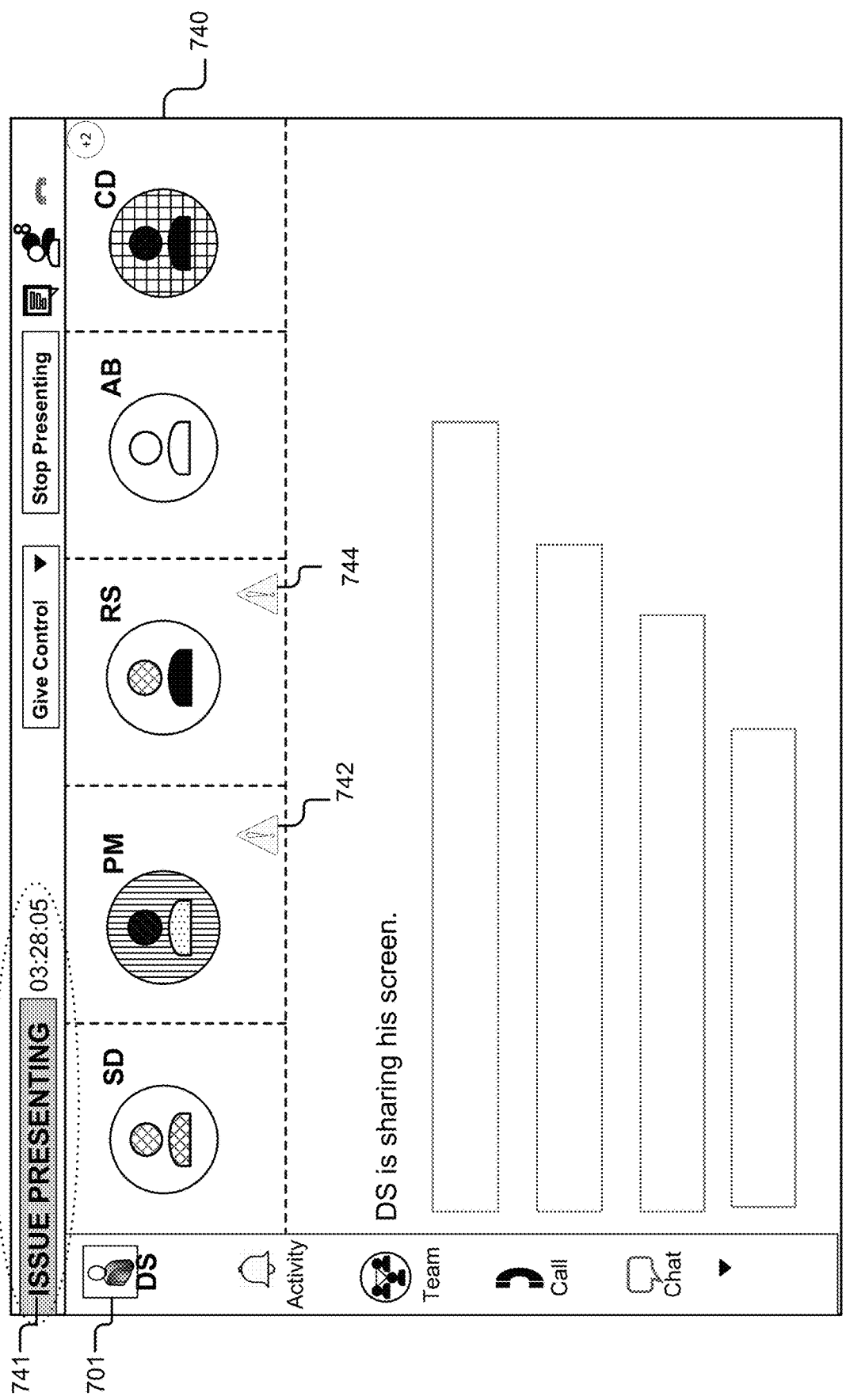
Figure 7D:
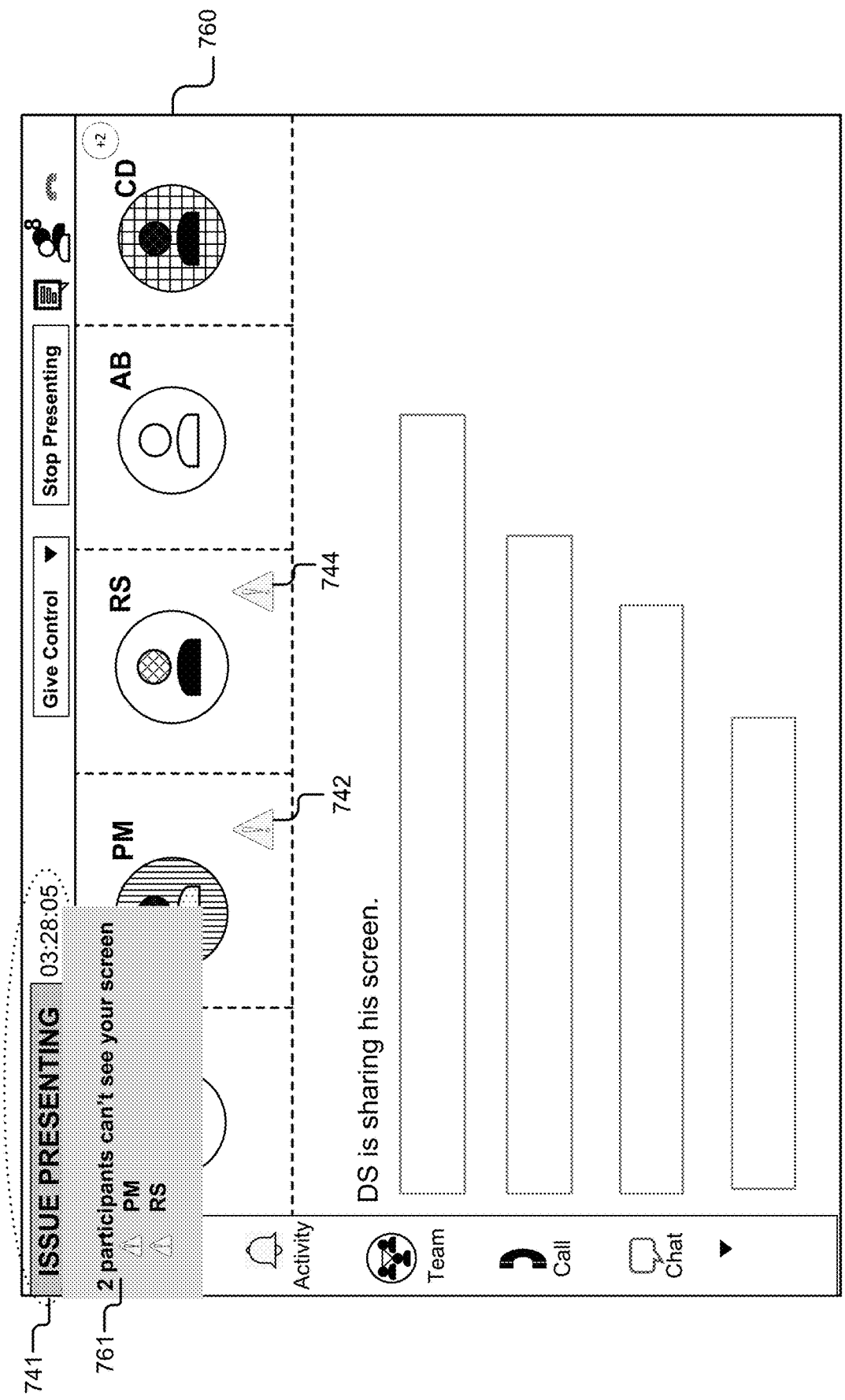
Figure 7E:
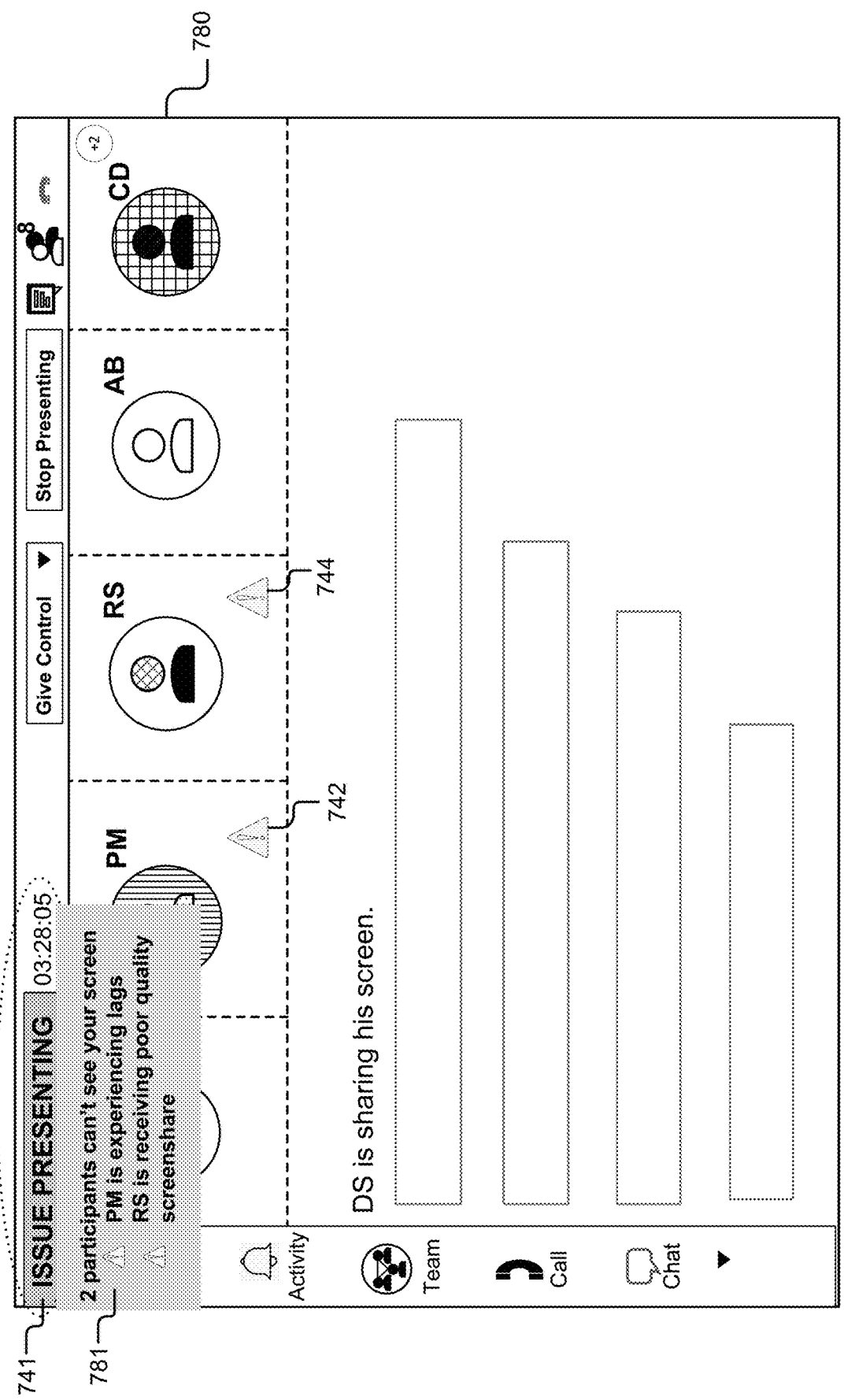

As shown in the meeting interface 700 of FIG. 7A, when the presenter, i.e., user DS in 701, sends the screen or content frame and starts the screensharing, the status of the screensharing session is "connecting" as shown in 703. When screen sharing goes normally, that is, after some time, every recipient can see the shared screen with the right resolution/quality at right time without lags, the meeting interface 700 of the presenter DS 701 in FIG. 7A is updated to the meeting interface 720 in FIG. 7B. As depicted in FIG. 7B, the confirmation of normal screensharing is reflected by the status of "presenting" in 721. The screensharing session continues. At a certain point in time, an issue happens. Maybe one participant no longer receives the content frame, or one participant is experiencing lags. In the meeting interface 740 of FIG. 7C, the status is changed to "issue presenting" in 741 and is automatically displayed to presenter 701. In the meantime, the two recipients PM and RS that have caused the status change are identified by warning labels 742 and 744. FIGS. 7D and 7E elaborate the "issue presenting" status 741 shown in FIG. 7C with issue descriptions. In the meeting interface 760 of FIG. 7D, a brief issue description 761 is added to attract the presenter's attention to two specific recipients PM and RS because they caused "issue presenting" status 741. In the meeting interface 780 of FIG. 7E, another issue description 781 is added. This description not only includes the identities of the recipients who cannot receive the content frame properly but also lists the reasons why the recipients cannot receive the content frame properly. In the example of FIG. 7E, the description shows that the user PM is experiencing lags and the user RS is receiving poor quality screen share. These issues trigger the failure status "issue presenting" status in 741.

FIG. 8 is an example graphical user interface 800 of an individual status notification. When a participant has caused an issue in screensharing, not only the presenter will automatically be notified, sometimes, the participant will also be notified to take corrective action. The participant causing the issue may be a recipient or the presenter. The example meeting interface 800 in FIG. 8 is associated with a recipient, i.e., user PM in 801. As shown by warning labels 803 and 805, user PM is one of the two recipients who caused the "issue presenting" status in 807. An individual status notification 809 is generated and displayed to the user PM. The individual status notification 809 tells the user PM that he/she is not receiving the full content shared by the presenter DS and reminds the user PM to take action to improve the screensharing. For example, the action can be checking the CPU usage of his/her computer.

Figure 9:
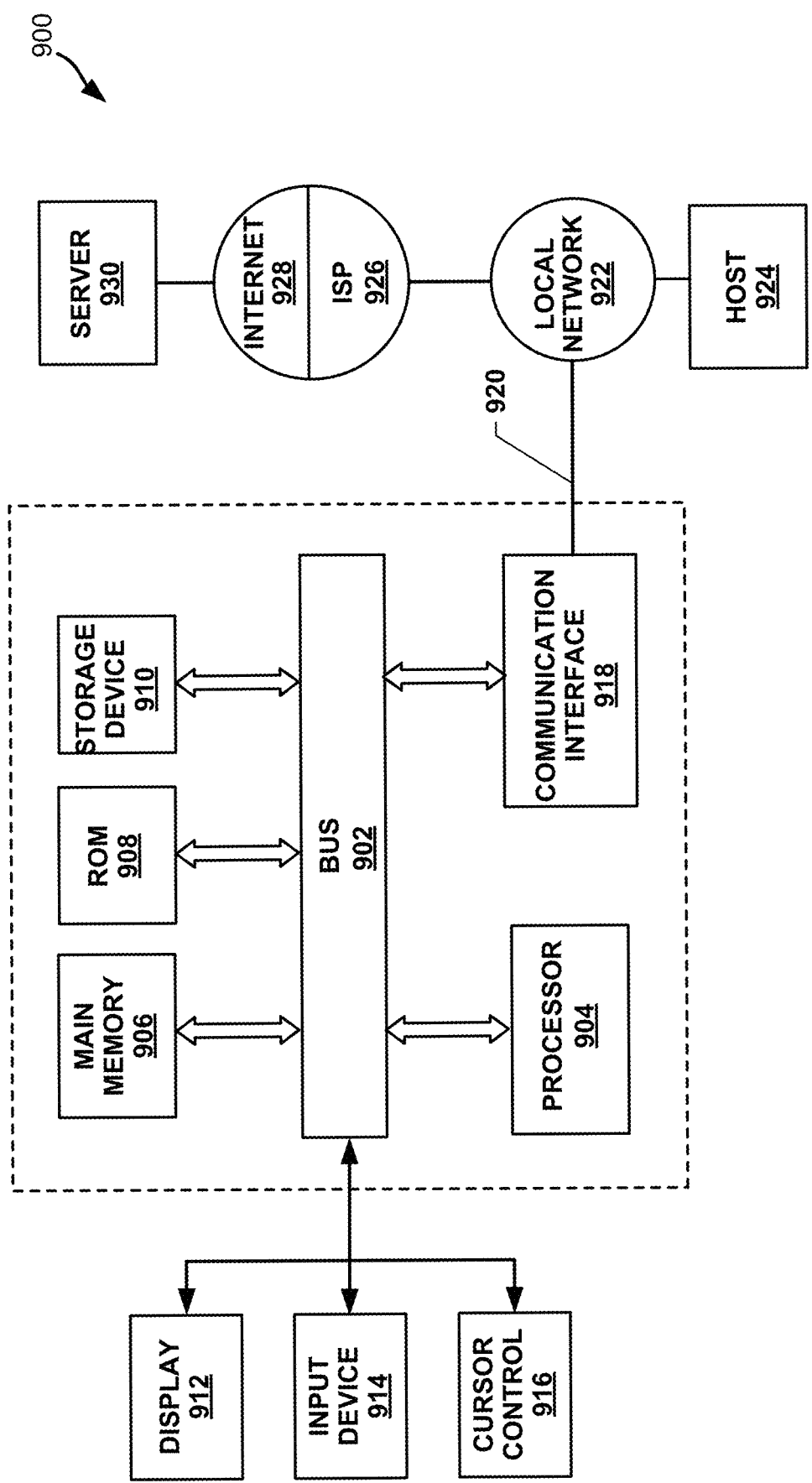
FIG. 9 is a functional block diagram of an example computer system upon which aspects of this disclosure may be implemented.

FIG. 9 is a functional block diagram of an example computer system 900 upon which aspects of this disclosure may be implemented. It will be understood that the logic blocks illustrated in FIG. 9 represent functions, and do not necessarily correspond to particular hardware on a one-to-one basis. The computer system 900 can include a data processor 904, coupled by a bus 902 to an instruction memory or main memory 906, a read-only memory 908, and a storage device 910. The instruction memory 906 can include a tangible medium retrievably storing computer-readable instructions, that when executed by the data processor 904 cause the processor to perform functions, processes, and operations described herein, for example, in reference to FIGS. 1-4.

The computer system 900 can also include a display 912, a user interface or other input device 914, and a cursor control 916, either as separate devices or combined, for example, as a touchscreen display. The computer system 900 can also include a communications interface 918, configured to interface with a local network 922 by a bus 920 for accessing a local host server 924, and to communicate through an ISP 926 to the Internet 928, and access a remote server 930.

Some implementations comprise a computer-readable storage media including executable instructions, that when executed on at least one processor, cause the processor to perform any of the above-described methods.

While various implementations have been described, the description is intended to be exemplary, rather than limiting, and it is understood that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 106, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A system for automatically detecting issues during screensharing in an online meeting, the system comprising:
   a processor; and
   a memory, coupled to the processor, storing executable instructions that, when executed by the processor, cause the system to:
      receive, at a server via a first signaling channel, a request for initiating a screensharing session from a first computing device associated with a first presenter of the online meeting, wherein the first presenter shares a set of content frames with a plurality of participants of the online meeting in the screensharing session;

in response to receiving the request, initiate the screensharing session by:

establishing a first media channel for transmitting the set of content frames from the first computing device associated with the first presenter to the server; and establishing respective second media channels for transmitting the set of content frames from the server to each of second computing devices associated with the plurality of participants;

subsequent to transmitting a content frame in the set of content frames to each of the second computing devices via the respective second media channel, among the second media channels corresponding to each of the second computing devices, detect, respectively, by the server, acknowledgment responses to the content frame from each of the second computing devices on second signaling channels respectively associated with each of the second computing devices, the acknowledgment responses acknowledging receipt of the content frame;

perform a diagnosis of the screensharing session by analyzing the acknowledgement response to the content frame from each of the second computing devices according to a preset criterion;

generate, by the server, a status notification of the screensharing session according to a result of the analyzing; and transmit, via the first signaling channel, the status notification from the server to the first computing device to cause the first computing device associated with the first presenter to display a visual indicator on a meeting interface of the online meeting, wherein the visual indicator indicates a status of the screensharing session.

2. The system of claim 1, wherein the status is a connecting status, and the executable instructions further include instructions that, when executed by the processor, cause the system to:

prior to detecting the acknowledgment response to the content frame, determine that each of the second computing devices associated with the plurality of participants is in progress of receiving the content frame; and generate and transmit the status notification to cause display of the visual indicator that indicates the connecting status.

3. The system of claim 1, wherein the status is a presenting status, and the presenting status indicates that each of the second computing devices has successfully received the content frame of a threshold quality within a first threshold time.

4. The system of claim 1, wherein the status is an issue presenting status, and the issue presenting status indicates that each of the second computing devices has successfully received the content frame within a first threshold time and the content frame received by at least one of the second computing devices fails to satisfy a threshold quality.

5. The system of claim 1, wherein the status is an issue presenting status, and the issue presenting status indicates that at least one of the second computing devices fails to receive the content frame within a first threshold time.

6. The system of claim 5, wherein the status notification includes an issue description for the issue presenting status, and the issue description includes at least one of an identity of a participant who fails to receive the content frame and a reason that the participant fails to receive the content frame.

7. The system of claim 6, wherein the executable instructions further include instructions that, when executed by the processor, cause the system to:

generate, by the server, an individual status notification for the participant who fails to receive the content frame, the individual status notification including the reason that the participant fails to receive the content frame and notifying the participant to take appropriate action; and cause the individual status notification to be displayed on a second computing device associated with the participant.

8. The system of claim 1, wherein the status notification is generated based on the acknowledgment responses detected within a first threshold time, and the executable instructions further include instructions that, when executed by the processor, cause the system to:

determine, by the server, whether to update the status notification of the screensharing session based on acknowledgment responses detected on the second signaling channels within a second threshold time after the first threshold time; and in response to determining to update the status notification, generate, by the server, an updated status notification; and transmit, via the first media channel, the updated status notification to the first computing device to cause the visual indicator to be automatically updated on the first computing device associated with the first presenter.

9. The system of claim 1, wherein to initiate the screensharing session, the executable instructions further include instructions that, when executed by the processor, cause the system to:

receive, at the server via the first signaling channel, target attributes associated with the set of content frames from the first computing device associated with the first presenter;

transmit, via the respective second signaling channels, the target attributes associated with the set of content frames to each of the second computing devices associated with the plurality of participants; and wherein each acknowledgment response to the content frame is respectively generated by each of the second computing devices based on:

identifying attributes of the content frame received at the second computing device; and comparing the identified attributes to the target attributes associated with the content frame.

10. The system of claim 9, wherein the target attributes include at least one of a number of content frames in the set of content frames, a starting timestamp indicating a time when each content frame was sent by the first computing device, a resolution of each content frame that the second computing device is targeted to receive, and an end timestamp indicating a time when the second computing device is targeted to receive each content frame.

11. The system of claim 1, wherein the executable instructions further include instructions that, when executed by the processor, cause the system to:

monitor, by the server, transmission of each content frame in the set of content frames to each of the second computing devices via the second media channel;

detect, by the server, each acknowledgment response to each content frame from each of the second computing devices associated with the plurality of participants on the second signaling channel;

update the status notification; and transmit the updated status notification to cause the visual indicator to be automatically updated and displayed on the first computing device associated with the first presenter to reflect a status update determined based on the detected acknowledgment response.

12. The system of claim 1, wherein the executable instructions further include instructions that, when executed by the processor, cause the system to notify at least one of the first presenter and the plurality of participants to take appropriate action when the status notification includes an issue presenting status.

13. A method for automatically detecting issues during screensharing in an online meeting, the method comprising:

receiving, at a server via a first signaling channel, a request for initiating a screensharing session from a first computing device associated with a first presenter of the online meeting, wherein the first presenter shares a set of content frames with a plurality of participants of the online meeting in the screensharing session;

in response to receiving the request, initiating the screensharing session by:

establishing a first media channel for transmitting the set of content frames from a first computing device associated with the first presenter to the server; and establishing respective second media channels for transmitting the set of content frames from the server to each of second computing devices associated with the plurality of participants;

subsequent to transmitting a content frame in the set of content frames to each of the second computing devices via the respective second media channel, among the second media channels corresponding to each of the second computing devices, detecting, respectively, by the server, acknowledgment responses to the content frame from each of the second computing devices on second signaling channels respectively associated with each of the second computing devices, the acknowledgment responses acknowledging receipt of the content frame;

performing a diagnosis of the screensharing session by analyzing the acknowledgement response to the content frame from each of the second computing devices according to a preset criterion;

generating, by the server, a status notification of the screensharing session according to a result of the analyzing; and transmitting, via the first signaling channel, the status notification from the server to the first computing device to cause the first computing device associated with the first presenter to display a visual indicator on a meeting interface of the online meeting, wherein the visual indicator indicates a status of the screensharing session.

14. The method of claim 13, wherein the status is a connecting status, and the method further comprising:

prior to detecting the acknowledgment response to the content frame, determining that each of the second computing devices associated with the plurality of participants is in progress of receiving the content frame; and generating and transmitting the status notification to cause display of the visual indicator that indicates the connecting status.

15. The method of claim 13, wherein the status is a presenting status, and the presenting status indicates that each of the second computing devices has successfully received the content frame of a threshold quality within a first threshold time.

16. The method of claim 13, wherein the status is an issue presenting status, and the issue presenting status indicates that each of the second computing devices has successfully received the content frame within a first threshold time and the content frame received by at least one of the second computing devices fails to satisfy a threshold quality.

17. The method of claim 13, wherein the status is an issue presenting status, and the issue presenting status indicates that at least one of the second computing devices fails to receive the content frame within a first threshold time.

18. The method of claim 17, wherein the status notification includes an issue description for the issue presenting status, and the issue description includes at least one of an identity of a participant who fails to receive the content frame and a reason that the participant fails to receive the content frame.

19. The method of claim 18, further comprising:

generating, by the server, an individual status notification for the participant who fails to receive the content frame, the individual status notification including the reason that the participant fails to receive the content frame and notifying the participant to take appropriate action; and causing the individual status notification to be displayed on a second computing device associated with the participant.

20. The method of claim 13, wherein to initiate the screensharing session, the method further comprising:

receiving, at the server via the first signaling channel, target attributes associated with the set of content frames from the first computing device associated with the first presenter;

transmitting, via the respective second signaling channels, the target attributes associated with the set of content frames to each of the second computing devices associated with the plurality of participants; and wherein each acknowledgment response to the content frame is respectively generated by each of the second computing devices based on:

identifying attributes of the content frame received at the second computing device; and comparing the identified attributes to the target attributes associated with the content frame.

* * * * *